(12) United States Patent
Larsen et al.

(10) Patent No.: US 8,951,498 B2
(45) Date of Patent: Feb. 10, 2015

(54) SYNTHESIS OF HIERARCHICAL NANOCRYSTALLINE ZEOLITES WITH CONTROLLED PARTICLE SIZE AND MESOPOROSITY

(75) Inventors: Sarah Larsen, Iowa City, IA (US); Anton Petushkov, Lafayette Hill, PA (US)

(73) Assignee: University of Iowa Research Foundation, Iowa City, IA (US)

( * ) Notice: Subject to any disclaimer, the term of this patent is extended or adjusted under 35 U.S.C. 154(b) by 343 days.

(21) Appl. No.: 13/193,180

(22) Filed: Jul. 28, 2011

(65) Prior Publication Data

US 2012/0027673 A1    Feb. 2, 2012

Related U.S. Application Data

(60) Provisional application No. 61/369,386, filed on Jul. 30, 2010.

(51) Int. Cl.
| | |
|---|---|
| *C01B 39/04* | (2006.01) |
| *C01B 39/40* | (2006.01) |
| *B82Y 30/00* | (2011.01) |
| *C01B 39/48* | (2006.01) |

(52) U.S. Cl.
CPC .............. *C01B 39/04* (2013.01); *B82Y 30/00* (2013.01); *C01B 39/40* (2013.01); *C01B 39/48* (2013.01); *C01P 2004/64* (2013.01); *C01P 2006/12* (2013.01); *C01P 2006/14* (2013.01); *C01P 2006/16* (2013.01)
USPC .......................................... 423/704; 423/702

(58) Field of Classification Search
None
See application file for complete search history.

(56) References Cited

U.S. PATENT DOCUMENTS

| | | | | |
|---|---|---|---|---|
| 3,308,069 | A * | 3/1967 | Rosinski et al. | ................. 502/62 |
| 4,808,800 | A * | 2/1989 | Nishijima et al. | ........ 235/58 CF |
| 6,669,924 | B1 | 12/2003 | Kaliaguine et al. | |
| 7,361,328 | B2 | 4/2008 | Kim et al. | |
| 7,585,490 | B2 | 9/2009 | Larsen et al. | |
| 2007/0071666 | A1 * | 3/2007 | Larsen et al. | .................. 423/351 |

FOREIGN PATENT DOCUMENTS

| | | |
|---|---|---|
| CN | 101428818 A | 5/2000 |
| WO | WO-2004058643 A1 | 7/2004 |

OTHER PUBLICATIONS

Na et al, Cyclic diquaternary ammoniums for nanocrystalline BEA, MTW and MFI zeolites with intercrystalline mesoporosity, 2009, journal of materials chemistry, 19. pp. 6713-6719.*

(Continued)

*Primary Examiner* — Melvin C Mayes
*Assistant Examiner* — Stefanie Cohen
(74) *Attorney, Agent, or Firm* — Schwegman Lundberg & Woessner, P.A.

(57) ABSTRACT

A one step synthesis of nanocrystalline zeolites ZSM-5 and Naβ from a single template system in high yield has been discovered. The size of individual nanocrystals, as well as mesopore surface area and pore volume can be controlled by adjusting the pH of the reaction mixture, as well as the hydrothermal treatment temperature and duration. The mesopore volume and size distribution show a dependence on particle size such that smaller particles lead to higher mesopore volumes and narrower pore size distributions.

26 Claims, 16 Drawing Sheets

(56) References Cited

OTHER PUBLICATIONS

Feng-Shou, X., et al., "Catalytic Properties of Hierarchical Mesoporous Zeolites Templated with a Mixture of Small Organic Ammonium Salts and Mesoscale Cationic Polymers", Angewandte Chemie, 118(19), (2006), 3162-3165.

Groen, J. C., et al., "Desilication: on the controlled generation of mesoporosity in MFI zeolites", Journal of Materials Chemistry, 16, (2006), 2121.

Serrano, D. P., et al., "Molecular and Meso- and Macroscopic Properties of Hierarchical Nanocrystalline ZSM-5 Zeolite Prepared by Seed Silanization", Chem. Mater., 21(4), (2009), 641-654.

Xiangju, .Meng, "Templating route for synthesizing mesoporous zeolites with improved catalytic properties", NanoToday, 4(4), (2009), 292-301.

* cited by examiner

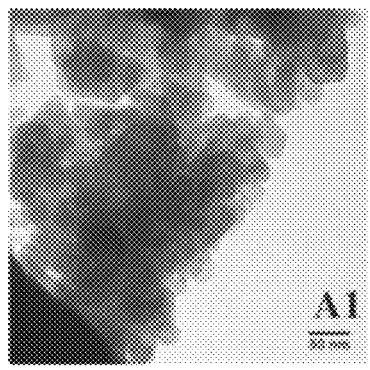
Fig. 6A1
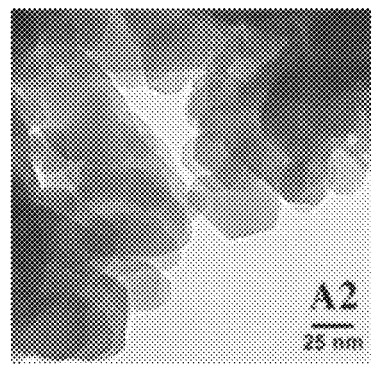
Fig. 6A2
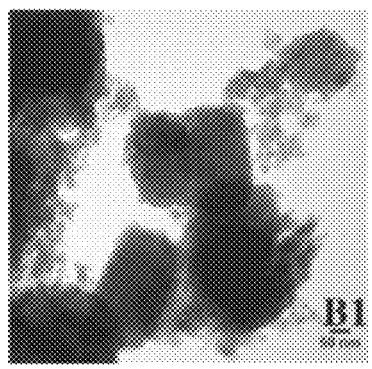
Fig. 6B1
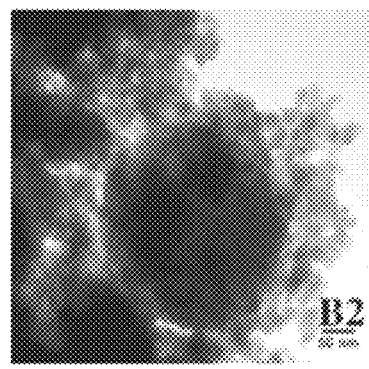
Fig. 6B2
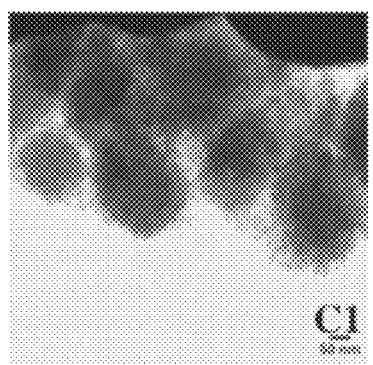
Fig. 6C1
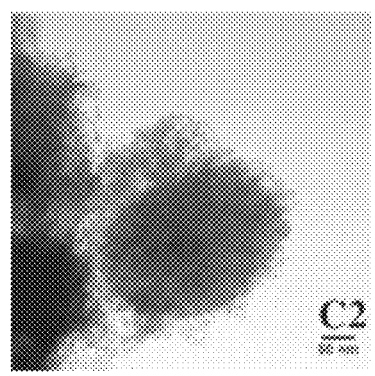
Fig. 6C2

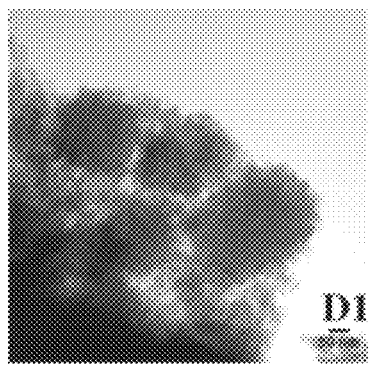
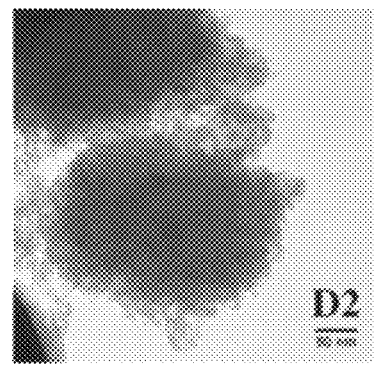
*Fig.6D1*     *Fig.6D2*

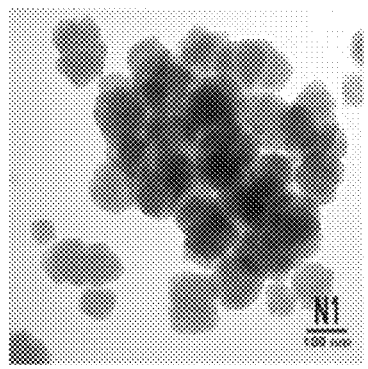
Fig. 17A1
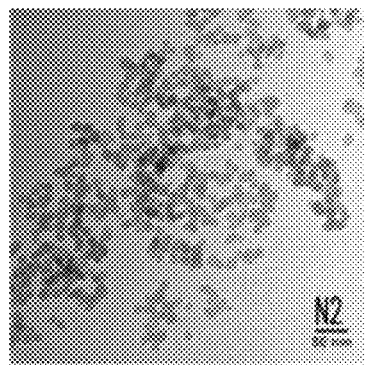
Fig. 17A2
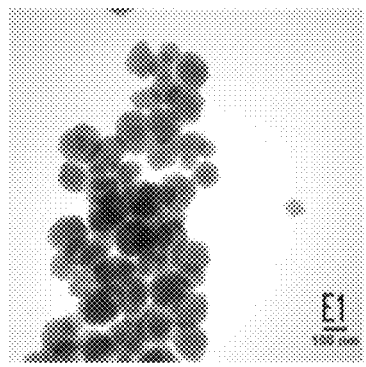
Fig. 17B1
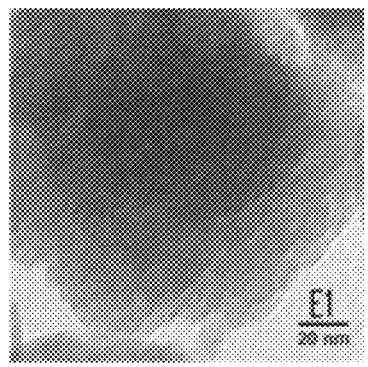
Fig. 17B2
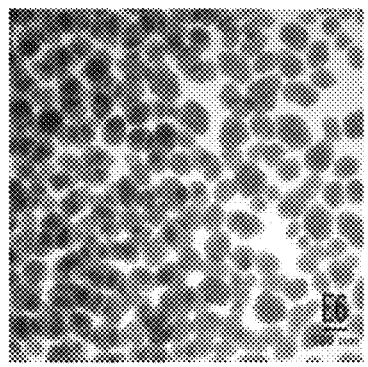
Fig. 17C1
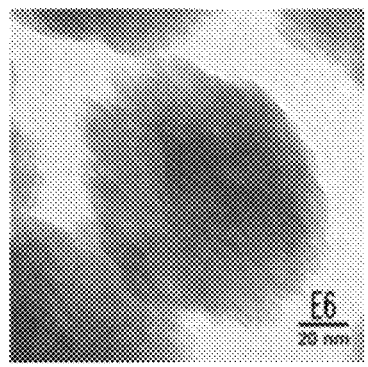
Fig. 17C2

SYNTHESIS OF HIERARCHICAL NANOCRYSTALLINE ZEOLITES WITH CONTROLLED PARTICLE SIZE AND MESOPOROSITY

CLAIM OF PRIORITY

This application claims the benefit of priority of U.S. Provisional Application No. 61/369,386, filed Jul. 30, 2010, the disclosure of which is incorporated herein by reference.

BACKGROUND

1. Field of Invention

This invention describes a one step synthesis of nanocrystalline zeolites having controlled particle size and micro and meso porosity.

2. Background

High surface areas and ion exchange properties of zeolites, as well as tunable silicon to aluminum ratio (SAR) are desirable properties which lead to their use as catalysts for a variety of different reactions. One of the most commonly used zeolites is ZSM-5, a zeolite with MFI type framework, 0.54 nm pore diameter, and SAR that can be varied from 10 to several hundred. ZSM-5 zeolite is usually synthesized with sodium cations acting as counter ions for the negatively charged framework. Sodium ions can then be replaced with other cations capable of entering the pores during a post-synthesis modification of the zeolite.

ZSM-5 zeolite has traditionally been used in the petroleum industry for fluid catalytic cracking due to the presence of acidic sites on its surface [1-4]. The ZSM-5 zeolite can be used in its H-form [1,2] or after ion exchange with different metal ions, such as nickel [3] or zinc [4]. Pt- and Ir-exchanged ZSM-5 zeolites are used in catalytic hydroisomerization of n-alkanes [5].

In the catalysis community, there has been a great deal of interest in nanocrystalline zeolites due to potential improvements in catalytic activity resulting from increased surface areas and decreased diffusion path lengths [6,7]. Several groups have compared the catalytic activity of nanocrystalline ZSM-5 to conventional micron-sized crystals [8-10]. Nanocrystalline ZSM-5 zeolites with particle sizes ranging from 20 to 50 nm were compared to microcrystalline ZSM-5 with respect to catalytic activity in epoxide rearrangement reactions [8]. The authors found that the nanocrystalline ZSM-5 zeolites had a significantly higher conversion rate and selectivity towards the desired products than the micron-sized zeolite. Choi and coworkers showed that micropore-mesopore composite materials formed from ultrathin sheets of ZSM-5 exhibit improved catalytic activity for methanol-to-gasoline conversion [9]. These composite materials were also more resistant to deactivation occurring due to coke deposition [9,11]. Firoozi et al. showed that the use of nanocrystalline ZSM-5 resulted in a higher methanol to propylene conversion rate than for large ZSM-5 crystals [10].

Since the ZSM-5 zeolite pore diameter is relatively small, diffusion of products and reactants in the case of large micron-sized crystals is slow. Different approaches have been taken to improve the catalytic performance of ZSM-5 zeolites. One approach is treating large zeolite crystals with acids or bases in order to create mesopores by leaching the framework atoms. Zeolite crystals several hundred nanometers in size were treated with sodium aluminate followed by acid treatment in order to create mesopores 4 to 15 nm in diameter [12]. Ogura used an aqueous sodium hydroxide solution in order to create mesopores in ZSM-5 crystals and concluded that the mesopore volume progressively increased with longer base treatment times [13]. However, the leaching technique can cause a change in the Si/Al ratio of the zeolite via selective dealumination or desilylation depending on the nature of leaching agent [12,13].

Nanocrystalline zeolite samples have been synthesized from reaction mixture gels [14-16]. The effect of crystallization time on the zeolite crystal size was studied by Mohamed et al. [14]. The reaction mixture was composed of sodium aluminate, fumed silica and tetra-n-propylammonium hydroxide (TPAOH), and hydrothermal treatment at 230° C. produced 55 to 80 nm sized crystals. The crystal size decreased at longer synthesis time, while the crystallinity increased. Song and coworkers found that the removal of ethyl alcohol in the reaction mixture produced during hydrolysis of TEOS (tetraethylorthosilicate), a source of silicon, affects the crystal size of the zeolite nanocrystals [15]. Majano and coworkers employed ZSM-5 seed crystals in a template free reaction mixture in order to obtain ZSM-5 particles 30-70 nm in size [16]. Larger zeolite crystals were obtained when the reaction temperature was increased from 100-120° C. to 170° C.

Several reports describe the synthesis of ZSM-5 zeolites with both micro- and mesopores [9,17-19]. Choi and coworkers used a bifunctional surfactant, composed of a 22 carbon atom alkyl chain and two quaternary ammonium groups separated by a $C_6$ alkyl linkage. The surfactant formed micelles, in which the quaternary ammonium atoms were located in planes, where the crystallization of ZSM-5 nanosheets occurred [9]. Zhu and coworkers employed a double template system, where the TPAOH template was governing crystallization of the MFI zeolite phase and polyvinyl butyral was used as a mesopore directing agent [17]. Xin et al. used a combination of TPABr (tetra-n-propylammonium bromide) and [3-(trimethoxysilyl)propyl]octadecyl-dimethylammonium chloride to synthesize iron-exchanged ZSM-5 powders containing mesoporous aggregates of smaller than 50 nm microporous ZSM-5 particles and tested the catalytic activity of the zeolite in selective hydroxylation of benzene to phenol [18]. Li and coworkers used a TPAOH/L-lysine co-template system and a two-step synthesis to prepare microspheres composed of stacked nanocrystals approximately 35 nm in size [19]. A micro-mesoporous composite with zeolite crystals around 20 nm in size was synthesized by using a mixture of TPAOH and alkyltriethoxysilane [20]. Chmelka and coworkers used a three step double template system, where ZSM-5 was precrystallized with TPAOH template followed by addition of mesopore forming phenylaminopropyltrimethoxysilane and heated at 90° C. for 6 hours. The resulting reaction mixture was then hydrothermally treated at 170° C. for 7 days, and zeolite crystals 5-10 nm in size were produced [21]. Fang and coworkers reported that the synthesis of mesoporous ZSM-12 zeolite is possible without the use of mesopore directing agent [22]. 20-30 nm zeolite nanocrystals forming aggregates under 1 μm in size were synthesized from a supersaturated reaction mixture. The authors concluded that formation of mesoporous aggregates using a single template system is achievable by a careful choice of the zeolite nucleation conditions, and that the zeolite nanocrystals form mesopores through self assembly. Tao et al. summarized different methods of mesoporous zeolite synthesis in their review work [23].

Zeolite beta is another commonly used zeolite in a number of catalytic reactions. Zeolite beta possesses intersecting pore channels approximately 6.6 Å in diameter, which places them between ZSM-5 (5.6 Å pores) and faujasite (7.4 pores) zeolites. The silicon to aluminum ratio in zeolite beta has been varied greatly, and lower Si/Al ratios have been found to favor a faster crystallization rate [30]. Pt and Pd loaded zeolites have been used for the selective hydrogenation of toluene with complete conversion and 100% selectivity under optimal conditions [31]. Modhera and coworkers studied hydroisomerization of 1-hexene over platinum loaded nanocrystalline zeolite-beta [32]. Nie et al. investigated the conversion of citral to menthol by Zr-loaded nanocrystalline zeolite beta. The use of zeolite beta resulted in a high yield as well as high diastereoselectivity towards the desired product [33]. Ding and coworkers reported that nanocrystalline zeolite beta with W—Ni catalyst had higher hydrodesulfurization, hydrodearomatization and hydrodenitrogenation activities than conventional micron-sized zeolite particles [34].

Different approaches to synthesis of hierarchical zeolite materials were summarized in a review by Pérez-Ramírez and coworkers [35]. Soler-Illia et al. discussed the fundamentals of zeolite synthesis and production of hierarchical zeolites in [36]. Mesoporous zeolites have been prepared by post-synthesis treatment of zeolites, such as leaching of large crystals with acids, [37] as well as inorganic [38] and organic bases [39-41]. During such treatments, selective desilylation or dealumination of the zeolite occurs leading to formation of mesopores. Pérez-Ramírez and coworkers employed a partial detemplation and disililation technique to more precisely control mesoporosity in b zeolite [41]. Chou and coworkers found that a post-synthesis treatment of zeolites with a strong base decreases the crystallinity and micropore volume of the material [42]. A method described by Mohr and Janssen described synthesis of mesoporous zeolites by synthesizing zeolite crystals first, then binding them with silica material and converting the silica binder into zeolite during the subsequent hydrothermal treatment [43].

Multiple approaches have been used to synthesize zeolite beta based hierarchical materials [44-50]. Camblor and coworkers studied the effect of Si/Al ratio on the crystal size of zeolite beta and found that crystals under 15 nm in size could be synthesized at low Si/Al ratios [44]. The mesopores originate from the interparticle distance, which are non-aggregated in the case of as-synthesized material and may be partially sintered after calcination. Kuechl and coworkers studied synthesis of pure silica zeolite-beta nanoparticles under 100 nm in size and different degree of aggregation using 4,40-trimethylenebis(1-methylpiperidine) template [45]. Several studies involved using a "hard template" approach, when a porous material, such as carbon black or silica gel is used to assist in mesopore formation [46-48]. Tong and coworkers employed a silica monolith and converted the amorphous walls into sodium beta zeolite, while using carbon as a transitional template and meso/macropore formation agent [46]. Valtchev et al. used a silica containing vegetal template (Equisetum arvense leaves and stems) in order to synthesize a hierarchical zeolite material containing micro, meso and macropores [47]. Lei and coworkers synthesized micromesoporous zeolite beta by modifying a bimodal pore silica gel with zeolite beta seed crystals and hydrothermally treating the system [48].

A "soft template" approach typically involves two molecular templates used simultaneously or in sequence to induce formation of the zeolite beta as a microporous phase with mesoporous areas between zeolite crystals [49-51]. Bagshaw and coworkers synthesized a zeolite beta/mesoporous silica composite which contained a structured mesopore and microporous zeolite areas [49]. Composite materials using MCM-41/zeolite-beta composites were synthesized by Xu et al. via dissolution of zeolite beta particles and subsequent hydrothermal treatment with hexadecyltrimethylammoniumbromide as a mesopore directing agent [50].

Aguado and coworkers prepared a hierarchical zeolite-beta material by hydrothermally treating zeolite beta nanocrystals, whose surface was functionalized with organosilanes. The organic moieties provided mesopore spacing between the zeolite crystals. The textural properties of the composite material depended on the type and concentration of organosilane groups on the zeolite seed crystals [51]. Fang and coworkers previously showed that synthesis of mesoporous MFI zeolite by adding a polyanion nucleation promoter $H_2PO_4^-$ is possible without the presence of a second, mesopore forming template [52]. Liu et al. demonstrated the synthesis of zeolite beta aggregates without a secondary template at different Si/Al ratios, with lowest primary particle size of 80 nm [53]. Different approaches to preparation of mesoporous zeolites have been summarized by Tao and coworkers [23].

SUMMARY

In one embodiment, the method of preparing mesoporous nanocrystalline zeolites comprises (a) contacting starting materials that comprise a solvent, a silicon source, a single organic template, and an aluminum source; for a period of time sufficient to produce a zeolite gel by hydrolysis;

(b) adjusting the concentration and pH of the zeolite gel (c) heating the zeolite gel, at a temperature and pressure sufficient to produce a nanocrystalline zeolite;

(d) separating the nanocrystalline zeolite crystals from the solution;

(e) washing and drying the nanocrystalline zeolite;

(f) calcining the samples to remove the template from the zeolite.

In one embodiment, the invention provides for a one step synthesis of nanocrystalline ZSM-5 from a single template reaction mixture. The size of individual crystals can be varied from approximately 40 nm to as low as 6 nm. The nanocrystals form mesoporous aggregates approximately 200 nm in size and the degree of mesoporosity was found to be particle size dependent. The crystal size and mesoporosity of the ZSM-5 samples is controlled by varying temperature, hydrothermal treatment duration and the pH of the reaction mixture. The smallest crystals were synthesized at a relatively low temperature of 140° C. and short hydrothermal treatment times with very good yields. The samples were characterized by a combination of spectroscopic, adsorption and electron microscopy techniques.

In another embodiment, the invention provides for a one step synthesis of nanocrystalline Naβ zeolite with hierarchal porosity from a single template system by tuning the reaction conditions, such as the concentration of the reacting species, temperature, synthesis duration as well as the pH. Naβ zeolite aggregates from about 120 to about 140 nm in size consists of crystals, which size ranges from about 15 to about 40 nm. The mesopore volume of the material depends on the particle size and the diameter of mesopores ranges from 10 to 15 nm.

Other aspects, advantages, and benefits of the present invention are apparent from the detailed description, examples, and claims provided in this application.

BRIEF DESCRIPTION OF THE DRAWINGS

Embodiments of the invention can be best understood by referring to the following description and accompanying drawings which illustrate such embodiments.

FIG. 6 shows transmission electron microscopy images of calcined ZSM-5 samples 1-N1 (22 m$^2$/g) (A), 1-N5 (47 m$^2$/g) (B), 1-E4 (122 m$^2$/g) (C), and 1-E6 (153 m$^2$/g) (D)

FIG. 17 shows TEM images of calcined Nβ Samples 2-N1, 2-N2, 2-E1, and 2-E6.

DETAILED DESCRIPTION

Figure 1:
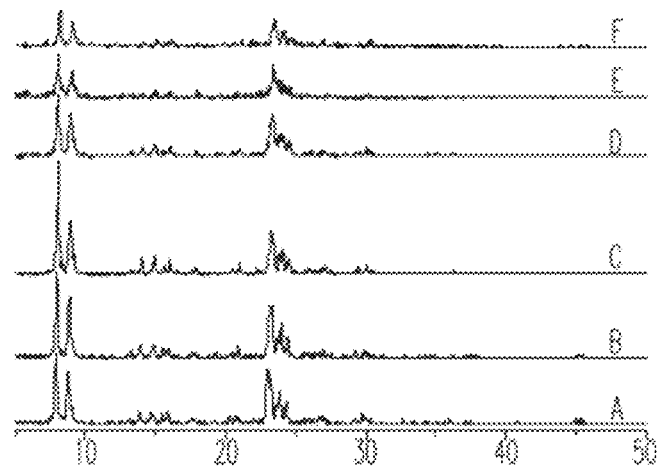
FIG. 1 shows the Powder XRD patterns of the ZSM-5 standard (A) and nanocrystalline ZSM-5 samples 1-N1 (22 m$^2$/g) (B), 1-N5 (47 m$^2$/g) (C), 1_E4 (122 m$^2$/g) (D), E6 (153 m$^2$/g) (E), and 1-E7 (175 m$^2$/g) (F).

Development of new zeolite based materials is essential for a variety of applications in catalysis, separations, and medicine. Increasing the specific surface area and decreasing the micropore diffusion pathlength in zeolites are important factors for improving the performance of zeolites in catalytic applications and these factors can be optimized by decreasing the zeolite particle size. Creation of a hierarchical zeolite material that possesses both micro- and mesopores with very large internal and external surface areas and improved mass transport properties is an effective solution. Hierarchical zeolite materials are an emerging and important class of catalysts for a variety of reactions.

Catalytic activity of zeolites can be increased by decreasing their crystal size. This results in shorter diffusion paths in micropores and external surface area constituting a larger fraction of the total surface area. Both factors allow an easier access of reactants to the active sites on the surface of the zeolite crystals. However, zeolite nanocrystals are reported to be less stable than micron-sized crystals. Separation of nanocrystals from the reaction mixture is also more challenging than in the case of larger particles. Another disadvantage of extremely small crystals is an increased pressure drop in packed reactor systems. One of the ways to overcome these disadvantages is synthesis of a hierarchal zeolitic material that consists of zeolite nanocrystals within larger size aggregates, with mesopores constituting the inter-crystalline space.

We have discovered a facile method of synthesizing nanocrystals that form mesoporous aggregates. The method employs only one type of structure directing agent, (tetra-n-propylammonium cations; TPA$^+$ cations). The effects of hydrothermal treatment temperature, synthesis duration and pH of the reaction mixture on the crystal size and the degree of mesoporosity were studied. For example, we have found that ZSM-5 crystals between 5.5 and 40 nm with narrow particle size distributions can be formed by appropriately tuning the synthesis parameters. In particular, a ZSM-5 sample (TABLE I, sample E4) with average crystal size of 6.4 nm and external surface area of 122 m$^2$/g was found to have the highest degree of mesoporosity, while its relative crystallinity and yield remained high. The method described herein provides an efficient, facile route to the preparation of high quality nanocrystalline zeolites with controlled particle size and porosity using a single template system. This synthetic method provides hierarchical nanocrystalline zeolite materials useful for catalytic applications.

While many approaches to the synthesis of zeolite beta nanoparticles and hierarchical structures have been reported in the literature, our method is distinct in that the zeolite beta synthesis conditions are systematically varied for a given Si/Al with a single template in order to control the particle size and mesoporosity. Specifically, we have discovered a one step synthesis of nanocrystalline zeolite beta with hierarchical porosity from a single template system in a one-step hydrothermal treatment. By tuning the reaction conditions, such as the concentration of the reacting species, temperature, synthesis duration as well as the pH, the zeolite particle size and the formation of mesoporous aggregates can be controlled. The concentration of the reactants in the synthesis gel has a profound effect on the degree of nanocrystals aggregation and thus, the mesopore volume and the external surface area of the samples can be controlled depending on the reaction conditions and nanocrystals size. The use of concentrated synthesis gels results in mesoporous aggregates of approximately 140 nm in size consisting of nanocrystals with sizes ranging from approximately 16-40 nm. The use of diluted reaction mixtures results in isolated zeolite nanoparticles with sizes of 23 and 156 nm. The ability to systematically control the zeolite morphology and thus the porosity has important implications for molecular transport in zeolites and for catalysis.

We have found that zeolite beta crystal size and the corresponding value of the external surface area have a strong dependence on the reaction temperature and time as well as the concentration of the reacting species and the pH conditions. Larger zeolite crystals were obtained at higher synthesis temperatures and longer hydrothermal treatment times. The synthesis temperature can be decreased to as low as 120° C. while keeping the reaction time reasonably short. One reaction parameter that had a profound effect on the morphology of the zeolite beta particles was the concentration of reactants in the synthesis gel. Hydrothermal treatment of reaction mixtures with pH 11.91 resulted in formation of non-aggregated nanocrystals under 20 nm in size or large zeolite beta particles with small external surface areas and low mesopore volumes. Synthesis from concentrated reaction mixtures produced zeolite-beta nanocrystals with large external surface areas that form mesoporous aggregates over 100 nm in size. Longer hydrothermal treatment of concentrated reaction mixtures was accompanied by the growth of zeolite beta crystals and a decrease in their external surface areas.

Further insight can be obtained from the work of Lobo and coworkers in which the mechanism of zeolite beta nucleation and growth was investigated [61]. In their study, it was shown that aluminum-containing secondary particles (defined as having dimensions of 6-50 nm) in the synthesis mixture exhibit instability and aggregate into larger tertiary particles (defined as having dimensions of >200 nm) when heated. The aggregation is believed to proceed due to weak repulsive forces between the aluminum containing particles. In our study, it is possible that similar aggregation of aluminum-containing particles is occurring in the concentrated reaction mixtures to produce mesoporous zeolite beta aggregates and that this is the source of the mesoporosity. In the less concentrated solutions, the aluminum containing particles show less tendency to aggregate and therefore do not form the mesoporous aggregates. Further studies of the synthesis of beta, particularly high silica beta, could provide support for this hypothesis.

DEFINITIONS

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The embodiments of the present invention relate to the synthesis and the use of nanocrystalline zeolites. When describing such methods, the following terms have the following meanings, unless otherwise indicated.

As used herein, the term "zeolite" refers to hydrous aluminum-sodium silicate in porous granules. Bennett, H. *Concise Chemical and Technical Dictionary*, 4$^{th}$ Ed., New York 1986, p. 1228. Zeolites are crystalline, aluminosilicate molecular sieves with pores of molecular dimensions. Examples of zeolites include ZSM-5 and Naβ.

As used herein, the term "zeolite gel" refers to a composition capable of forming zeolite crystals. The zeolite gel can contain template molecules and compounds providing silicon and/or aluminum sources.

As used herein, the term "hydrolysis" or "hydrolyzing" refers to the reaction of salt with water to form an acid and base; decomposition of organic compounds by interaction with water, either in the cold or on heating alone in the presence of acids or alkalis. Bennett, H. *Concise Chemical and Technical Dictionary*, 4$^{th}$ Ed., New York 1986, p. 631.

As used herein, the term "nanocrystalline" refers to crystals in the range of nanometers. For example, nanocrystalline zeolites can be zeolite crystals with a size smaller than 100 nm.

As used herein, the term "synthesis" refers to the formation of a chemical compound from more elementary substances. Bennett, H. *Concise Chemical and Technical Dictionary*, 4$^{th}$ Ed., New York 1986, p. 1096. For example, nanocrystalline zeolites can be synthesized from molecules serving as templates, silicon sources, aluminum sources, etc.

As used herein, the term "clear solution" refers to the zeolite gel solution before zeolite crystals have formed. The presence of zeolite crystals creates a cloudy solution, which in turn, becomes clear after the removal of formed zeolite crystals.

As used herein, the term "single template" refers to zeolites prepared using only one cationic compound, such as tetra-n-propylammonium. However the anion may be varied.

As used herein, the term "hierarchical zeolite materials" refers to zeolites made up of nanocrystals of one size, and having a separation between nanocrystals of a different size. Thus, the term hierarchical nanocrystalline zeolites refers to microporous nanocrystalline zeolites which also form mesopores.

As used herein, the term "NaAlO$_2$" refers to sodium aluminate.

As used herein, the terms "mesoporous" and "mesoporosity" refer to zeolites having a space of between 2 and 50 nm between zeolite nanocrystals or nanocrystal agglomerates.

As used herein, the term "micropore" refers to zeolites with pore sizes less than 2 nm.

As used herein, the term "macropore" refers to zeolites with pore sizes greater than 50 nm.

As used herein, the term "PTFE" refers to polytetrafluoroethylene.

As used herein, the term "TEOS" refers to tetraethylorthosilicate.

As used herein, the term "TPAOH" refers to tetra-n-propylammonium hydroxide.

As used herein, the term "TPABr" refers to tetra-n-propylammonium bromide.

Template

Most highly siliceous zeolites are formed in the presence of organic bases known as templates or structure directing agents. In the embodiments described herein, the zeolites are formed in the presence of a single organic template. Organic templates are porous materials that can serve as the structure around which a zeolite can form. In the absence of an organic template, zeolites that form can be too structurally dense to be of any practical use. Examples of organic template forming compounds are tetra-ammonium salts or hydroxide, such as, tetra-n-propylammonium hydroxide (TPAOH) ($C_{12}H_{29}O$), tetramethylammonium hydroxide (TMAOH) ($C_4H_{13}NO$), tetramethylammonium bromide (TPABr) ($C_4H_{12}BrN$), and tetra-n-propylammonium bromide (TPABr) ($C_{12}H_{28}BrN$). TPAOH can be used as an organic template for the formation of zeolites ZSM-5 and Naβ. In the embodiments described herein, the zeolites are formed in the presence of a single organic template. The tetraalkylammoinum salt can be used in an amount by mol percentage of about 0.6 to about 1.8% of the starting materials. A particular tetraalkylammonium hydroxide is TPAOH. A particular tetraalkylammonium salt is TPABr. Additional organic templates can be found in the Aldrich catalog, incorporated herein by reference. *Aldrich Handbook of Fine Chemicals*, 2003-2004 (Milwaukee, Wis.).

Silicon and Aluminum Sources

Zeolites are generally aluminosilicate structures in which silicon and aluminum are used to form the framework of the zeolite. Suitable compounds used as silicon and/or aluminum sources will hydrolyze (decompose with water) to free up silicon and aluminum to form the framework in the zeolite synthesis and subsequent crystal. Examples of silicon sources include, e.g., tetraethylorthosilane (TEOS) ($C_8H_{20}O_4Si$), colloidal or fumed silica (amorphous silica, such as Ludox L530), and disodium metasilicate ($Na_2O_3Si$). Examples of aluminum sources include, e.g., aluminum isopropoxide ($C_9H_{21}AlO_3$), sodium aluminate ($AlNaO_2$), and aluminum sulfate ($Al_2O_{12}S_3$). TEOS can be used as the silicon source for the formation of zeolites ZSM-5 and Naβ. TEOS can be used in an amount by mol percentage of about 1.7 to about 5.2% of the starting materials. TEOS and sodium aluminate can be used as the silicon and aluminum sources, respectively, for the formation of zeolites ZSM-5 and Naβ. TEOS can be used in an amount my mol percentage of about 0.69 to about 30% of the starting materials. Sodium aluminate can be used in an amount by mol percentage of about 0.05 to about 0.15% of the starting materials. The sodium cation released forms a part of the zeolite structure by stabilizing the charge and interlocking with the pore structure. Equivalent silicon and aluminum sources can be found in the Aldrich catalog, incorporated herein by reference. *Aldrich Handbook of Fine Chemicals,* 2003-2004 (Milwaukee, Wis.).

Solvent

Water is most often used as a solvent to facilitate the formation of zeolites. Water is used in excess and can be used in the formation of ZSM-5 and Naβ zeolites. Water can be used in an amount by mol percentage of about 91-99%, preferably about 94-96.5%, of the starting products for zeolite ZSM-5. For zeolite Naβ, water can be used in an amount by mol percentage of about 91.0-99.0%, preferably about 94.0-98.0%, of the starting products.

The starting products are mixed and stirred for a sufficient time and at an appropriate temperature to ensure hydrolysis of the silicon and/or aluminum sources. For example, TEOS can be the silicon source and sodium aluminate ($NaAlO_2$) can be the aluminum source. Room temperature can be an example of an appropriate temperature for hydrolysis. Overnight, or about 12 hours, can be an example of sufficient time to ensure hydrolysis. Ethanol is the hydrolysis product of TEOS. Once hydrolysis has occurred, a zeolite gel can be formed.

Zeolite Gel

The zeolite gel is the clear solution that is produced by the hydrolysis of the silicon and/or aluminum sources of the starting products. The stirring and mixing of the starting products ensures hydrolysis and frees up silicon to form the zeolite framework. Hydrolysis also produces by-products such as ethanol that can contribute to the physical properties of the zeolite gel, but do not take part in the formation of the zeolite. Starting products, such as the organic template, the cation/base such as sodium hydroxide, and an excess of water still remain after hydrolysis of the metal source. In the formation of zeolites ZSM-5 and Naβ, the hydrolysis of TEOS frees up silicon and produces ethanol, and the hydrolysis of sodium aluminate frees up aluminum. The ethanol is then part of the zeolite gel, but does not effectively participate in the formation of the zeolite from the gel.

Powder X-Ray Diffraction XRD and Product Yield

Nanocrystalline ZSM-5 zeolites were synthesized with and without an evaporation step (Example 1, TABLES I and II, Samples 1-N1 to 1-N7 and 1-E1 to 1-E7, respectively), with temperatures ranging from 135-165° C., and with hydrothermal synthesis times varying from 12-72 hours. The synthesis and characterization of the nanocrystalline ZSM-5 samples is summarized below in TABLE I. The samples are numbered in the order of increasing external surface area. Representative powder X-ray diffraction (pXRD) patterns are shown in FIG. 1 for a ZSM-5 standard sample (FIG. 1A), for ZSM-5 samples synthesized without the evaporation step (FIG. 1 B,C) and for ZSM-5 samples synthesized from partially evaporated gels (FIG. 1 D, E, F). Only characteristic reflections of MFI type zeolite were observed in the x-ray powder patterns. The relative crystallinity (RC) of the samples (TABLES I and II) synthesized without the evaporation step remains close to that of the reference standard. The percent yield of the zeolite samples mainly depends on the duration of hydrothermal treatment. Higher product yields correlate with longer synthesis times. The yield was in general over 80% except for the ZSM-5 samples 1-N6 and 1-N7, for which the yields were 59 and 53% respectively. These samples were also synthesized using the shortest hydrothermal treatment times and had the highest $S_{ext}$ values within the non-evaporated series.

The silicon to aluminum ratio (Si/Al) in the ZSM-5 zeolite samples determined by ICP-OES was consistently ~30 and did not change significantly at different synthesis temperature and time conditions. Further decrease of particle size and increase of external surface area were not possible under the reaction conditions investigated here. The use of shorter reaction times and lower synthesis temperatures resulted in production of ZSM-5 crystals with low relative crystallinity and poor yields.

The samples synthesized from reaction mixtures subjected to varying degrees of evaporation (samples 1-E1 to 1-E7) have a wider range of relative crystallinity (TABLES I and II). The RC value for these ZSM-5 samples has a stronger correlation with synthesis time and particle size. The samples synthesized after 48 and 72 hours of hydrothermal treatment have RC value around 100%. Samples 1-E3 to 1-E6, synthesized for 24 hours exhibited decreased RC as the particle size became smaller. Sample 1-E7, which had the shortest synthesis duration and smallest particle size, also had the smallest RC value. The percent yield of the samples synthesized with the evaporation step follow a trend similar to that of non-evaporated series. The yield remained generally high, with the exception of the largest surface area sample (175 $m^2$/g), which had a yield of only 42%. The Si/Al remained around 32 for samples with lower external surface area and decreased to around 26 in case of the smallest particle size samples. High zeolite product yield even after partial evaporation of the reaction mixture indicates that the silicon and aluminum precursors are not removed from the solution during the evaporation process.

Figure 11:
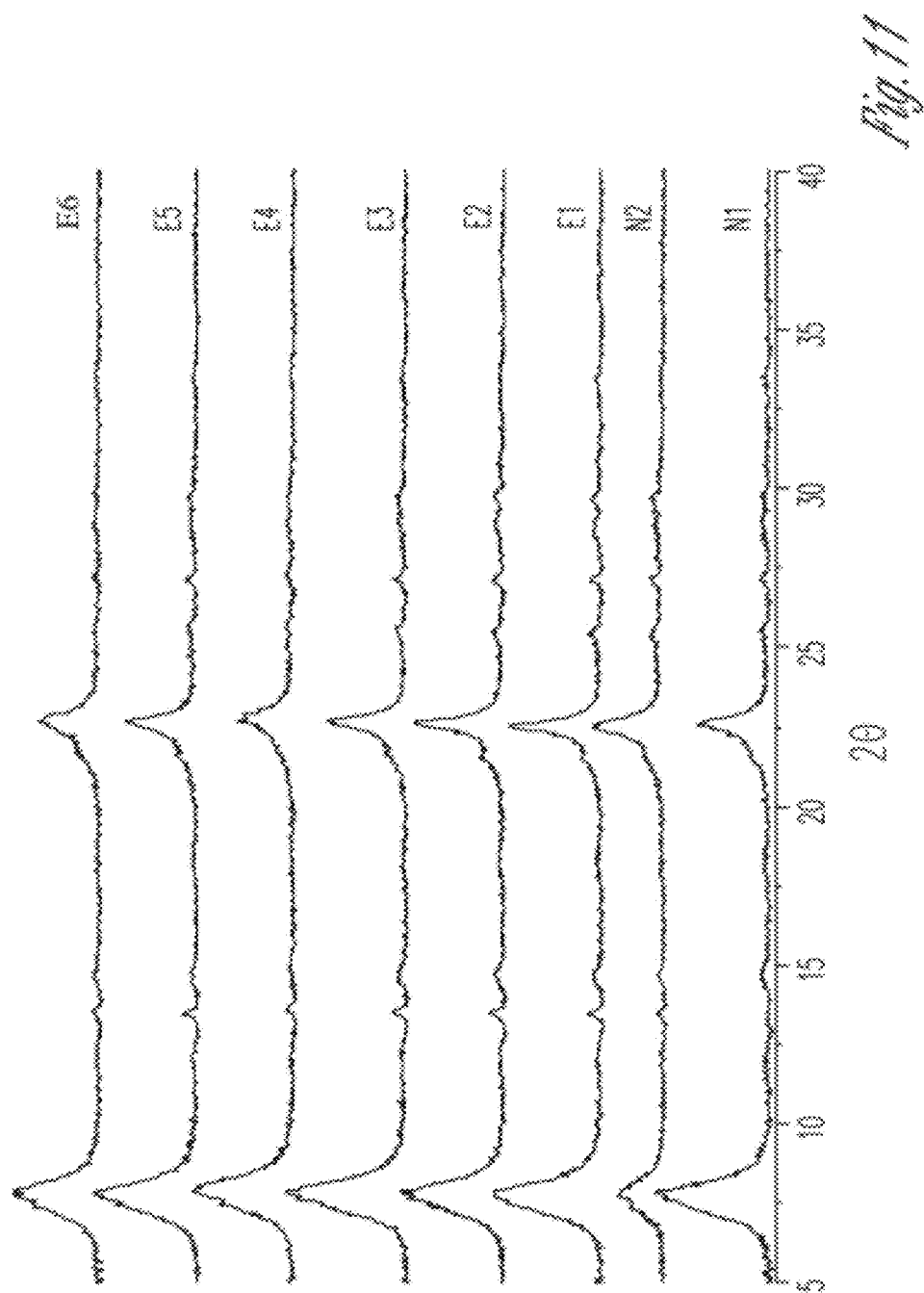
FIG. 11 shows the powder XRD patterns of clacined Naβ zeolite samples 2-N1, 2-N2, 2-E1, 2-E2, 2-E3, 2-E4, 2-E5, and 2-E6.

Powder XRD patterns of the zeolite beta samples are shown in FIG. 11 and contain two major reflections at 7.8 and 22.5 2 h, which are characteristic of beta (BEA) type zeolite. No indication of impurities was observed in the XRD patterns of the samples. Relative crystallinity (RC) of the samples before calcination was significantly higher than that of the external reference. The reflection of the 22.5 2 h peak used for RC decreases after calcination and consequently the RC values of calcined samples decreased and became very close to that of the external reference.

The silicon to aluminum ratio (Si/Al) in the synthesized mesoporous zeolite beta samples was also determined by ICP-OES. The Si/Al is similar for samples synthesized in different reaction conditions and ranged between 16 and 18. The concentration of the synthesis gel did not affect the Si/Al ratio in the samples. The Si/Al ratio in the solids is lower than in the synthesis gel, which was Si/Al=25. This observation is consistent with the study by Mintova and coworkers, who synthesized zeolite beta nanocrystals with silicon to aluminum ratio ranging from 25 to 250 in the precursor gel, while the corresponding ratios in the final solids varied between 14 and 42 [30]. The results for zeolite Naβ are shown in Example 2, TABLE III.

Surface Area and Pore Volume Characteristics

The external surface area and particle size of the ZSM-5 zeolites synthesized from the reaction mixture without the evaporation step was varied by carrying out the synthesis at different temperatures (140 to 165° C.) and reaction times (12 to 72 hours). Generally, hydrothermal treatment at lower temperatures for shorter periods of time leads to production of smaller particles with larger external surface areas. However, the external surface area of the samples synthesized without an evaporation step (N1-N7) did not change much under different synthesis conditions and ranged from 22 to 60 m$^2$/g for this series of samples. In contrast, the external surface area of the samples synthesized from reaction mixtures with varying degrees of evaporation (1-E1 to 1-E7) ranged from 35 m$^2$/g for the sample hydrothermally treated for 72 hours to 175 m$^2$/g in the case of the sample synthesized for 12 hours (TABLES I and II) indicating that evaporation can be used as a variable to control the ZSM-5 external surface area and thus, particle size.

The total surface area ($S_{tot}$) of the zeolite samples varied from about 320 to 440 m$^2$/g. The value of $S_{tot}$ strongly correlates with the value of $S_{ext}$. The zeolite sample with the smallest $S_{ext}$ of 22 m$^2$/g also had the smallest $S_{tot}$ of 320 m$^2$/g. The ZSM-5 sample with highest $S_{ext}$ of 175 m$^2$/g had $S_{tot}$=439 m$^2$/g. Conversely, the internal surface area ($S_{int}$) varied little from one zeolite sample to another and remained constant at about ~300 m$^2$/g (264-313 m$^2$/g). Only the ZSM-5 samples with the highest external surface areas of 153 and 175 m$^2$/g exhibited a decrease of $S_{int}$ to 287 and 264 m$^2$/g respectively. While $S_{int}$ does not depend on the particle size, it correlates with the relative crystallinity of samples determined by powder XRD. The ZSM-5 samples with the lowest crystallinity also had the smallest $S_{int}$.

Figure 2:
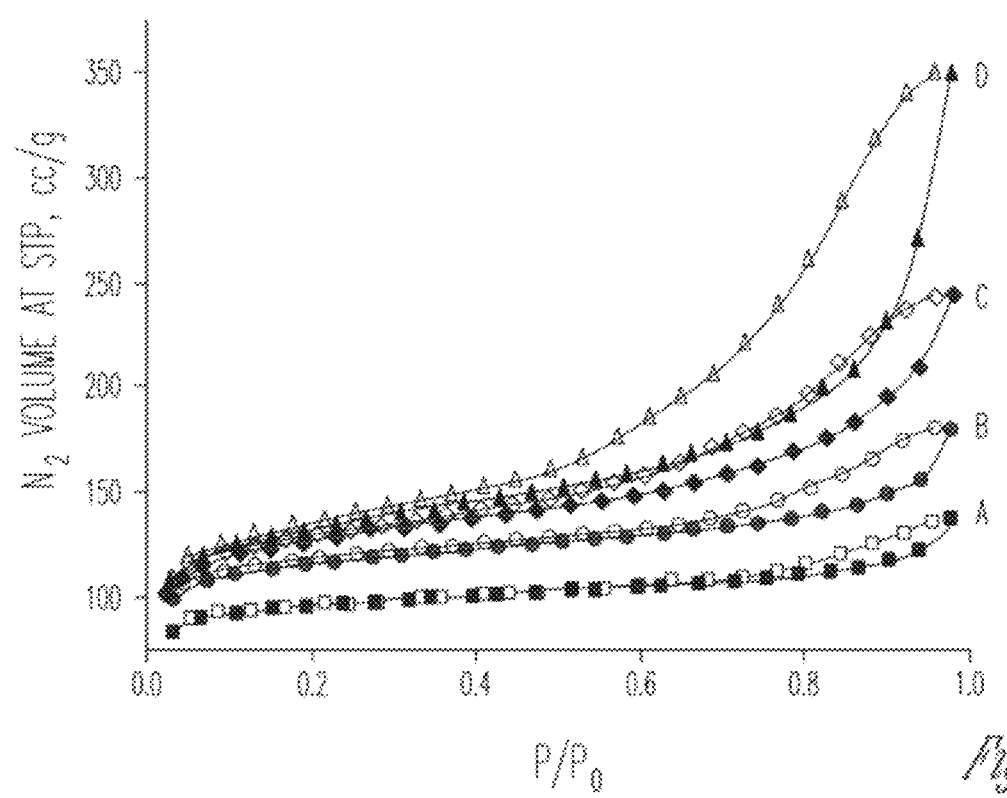
FIG. 2 shows the nitrogen adsorption/desorption isotherms of nanocrystalline ZSM-5 zeolite samples 1-N1 (22 m$^2$/g) (A), 1-N5 (47 m$^2$/g) (B), 1-E3 (85 m$^2$/g) (C), and 1-E4 (122 m$^2$/g) (D).

The micropore volume ($V_{micro}$) of the ZSM-5 samples varied slightly from 0.102 to 0.151 cc/g (TABLE I). No significant dependence of micropore volume on the particle size or relative crystallinity of the samples was detected. However, the degree of mesoporosity of the samples varies strongly depending on the external surface area and particle size as shown in FIG. 2. As the $S_{ext}$ increases from 22 m$^2$/g to 122 m$^2$/g, the mesopore volume increases from 0.085 cc/g to 0.43 cc/g. Further increase of $S_{ext}$ to 153 (E6) and 175 m$^2$/g (E7) led to smaller $V_{meso}$ values. The decrease of $V_{meso}$ also correlates with smaller RC values obtained for the ZSM-5 nanocrystals of the smallest size. The decrease of mesopore volume in samples E6 and E7 may be the result of extremely small crystals forming denser aggregates or due to the presence of larger amount of amorphous aluminosilicate compared to the other ZSM-5 samples.

Figure 3:
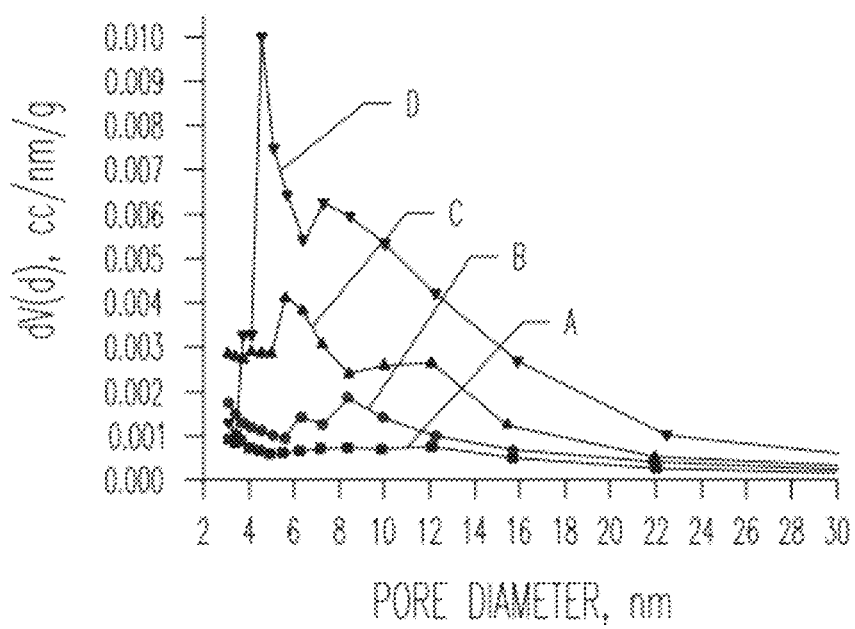
FIG. 3 shows the pore size distribution of the ZSM-5 samples 1-N1 (22 m$^2$/g) (A), 1-N5 (47 m$^2$/g) (B), 1-E3 (85 m$^2$/g) (C), and 1-E4 (122 m$^2$/g) (D)

Pore size distributions were obtained by applying the BJH model to nitrogen adsorption data as shown in FIG. 3. The ZSM-5 sample with the largest crystal size (1-N1, FIG. 3A) has limited mesoporosity, which increases as the zeolite crystal size is decreased (FIG. 3B-D). The majority of mesopores have diameters ranging from 4 and 12 nm. The mesopore size distribution in the ZSM-5 samples is wider than in case of conventional mesoporous materials, such as MCM-41. Large zeolite crystals appear to lack mesoporosity. The decrease of particle size results in higher mesopore volume and the shift of the average pore diameter toward smaller sizes. Wider size distribution of mesopores can be attributed to the fact that they are formed by stacked nanocrystals rather than mesopore structure directing agent, such as phenylaminopropyltrimethoxysilane (PHAPTMS) used by Serrano and coworkers [8]. The use of PHAPTMS allowed the authors to synthesize mesoporous zeolite aggregates with narrowly distributed pores 2 to 4 nm in diameter.

Figure 15:
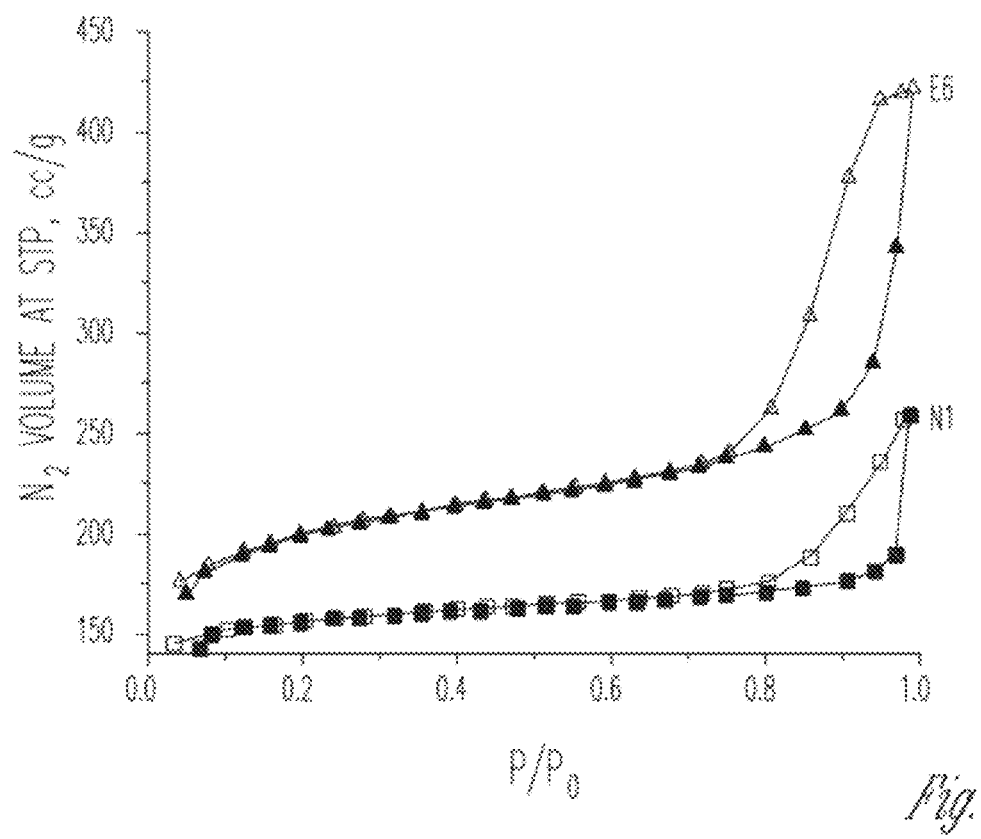
FIG. 15 shows the nitrogen sorption isotherms of calcined Naβ zeolite samples 2-N1 and 2-E6. Filled symbols represent the adsorption branch of the isotherm, open symbols represent the desorption branch.

For zeolite beta samples, nitrogen sorption isotherms were collected in order to determine the external, and mesopore surface areas and pore volumes, as well as the mesopore size distribution in the zeolite aggregates. The nitrogen sorption isotherms (FIG. 15) are a type IV isotherm which exhibits a hysteresis loop, indicating the presence of mesopores in the samples.

The total specific surface area (Stot) values of the nanocrystalline zeolite beta samples vary from 490 to 670 m$^2$/g. In general, samples with smaller crystal sizes have higher total surface areas than the samples with larger crystals. Sample 2-N1 with an estimated crystal size of 200 nm has the smallest Stot value (487 m$^2$/g) of all of the samples in both series. Samples 2-E1 through 2-E6 synthesized from concentrated reaction mixtures have similar Stot values ranging from 602 to 672 m$^2$/g.

The external surface area of the zeolite beta samples strongly depends on the reaction conditions. Lower temperatures and shorter synthesis durations lead to larger values of Sext. This dependence is associated with the relationship between the crystal size and the external surface area. The average size of the zeolite crystals within the aggregates can be estimated from the value of the external surface area [60]. A similar formula was derived for zeolite beta and is given below:

$$Sext=3252/x \text{ where } x=\text{average crystal size in nm}.$$

The derivation is provided as Supplementary information. Using this equation, the external surface area (Sext) from the E series in Table 1 was used to calculate the average crystal sizes which ranged from 25 to 41 nm. This range was found to be close to the individual crystal size estimated from TEM images to range from 16 to 40 nm (TABLE III).

The micropore volume of the zeolite samples showed a behavior similar to micropore surface area and did not vary significantly for the samples synthesized from concentrated reaction mixtures. The small difference between the micropore volume values of the zeolites is due to its dependence on the degree of crystallinity. Since the synthesized zeolite beta samples have similar relative crystallinity, it is reasonable to expect similar micropore volume parameters. Conversely, micropore volumes of the two samples synthesized from a dilute reaction gel are significantly different from the mesoporous samples as well as from each other. The Vmicro of 2-N1 was 0.306 cc/g and was the highest of all of the samples due to the large crystal size. Vmicro of N2 was 0.196 cc/g, which was slightly lower than the Vmicro values of the 2-E1 2-E6 samples which ranged from 0.217 to 0.233 cc/g.

The mesopore volumes of the zeolite samples changed significantly depending on the reaction conditions. Sample 2-N1 with largest crystals had the smallest mesopore volume, which increased in the case of zeolite samples with smaller crystals. Interestingly, zeolite beta Sample 2-N2 showed a high mesopore volume, which was attributed to the presence voids between the crystals that do not have any strong bonds between each other and can be dispersed as individual particles as shown by TEM.

Figure 16:
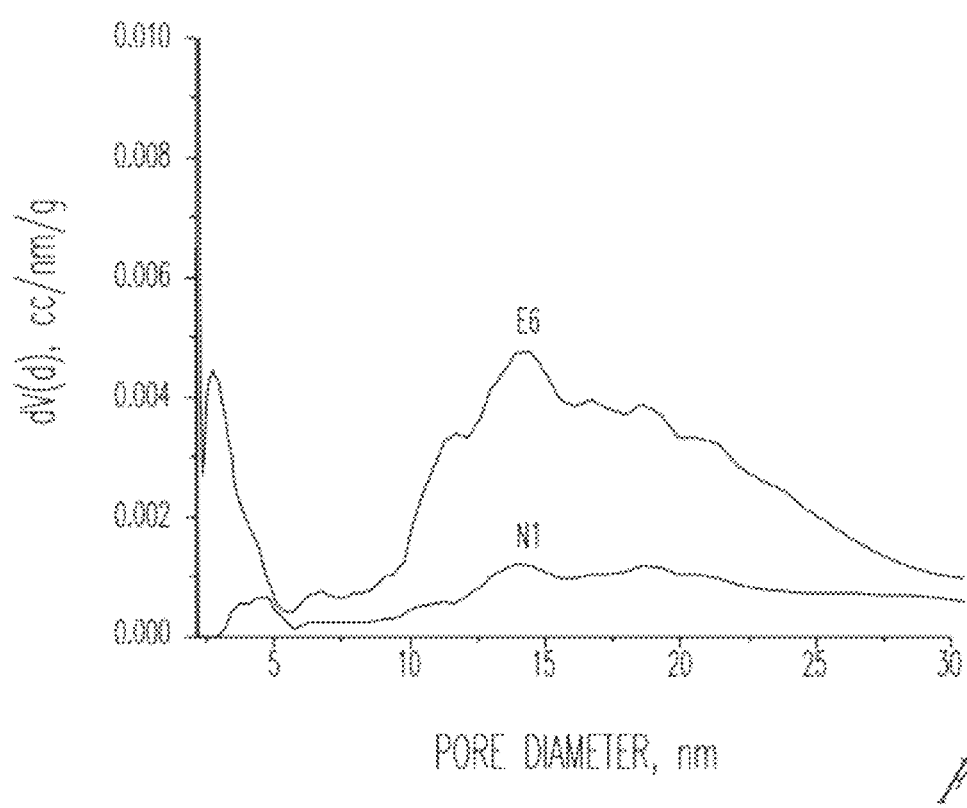
FIG. 16 shows the pore size distribution in calcined Nab zeolite samples 2-N1 and 2-E6.

The pore size distribution in the zeolite aggregates was compared for Samples 2-N1 and 2-E6 (FIG. 16), which have the largest disparity between their pore volume and surface area properties. Sample 2-N1 shows a broad distribution of mesopores that occupy a small volume, and the majority of mesopores are over 10 nm in size. Sample 2-E6 has a significantly higher mesopore volume and the pore size distribution plot contains two peaks, around 3 and 15 nm. The smaller pores are attributed to intercrystalline distance within the aggregates whereas the bigger pores are likely to originate from the inter-aggregate distances.

The results for zeolite Naβ are shown in Example 2, TABLE III.

$^{27}$Al and $^{29}$Si MAS NMR

Figure 4:
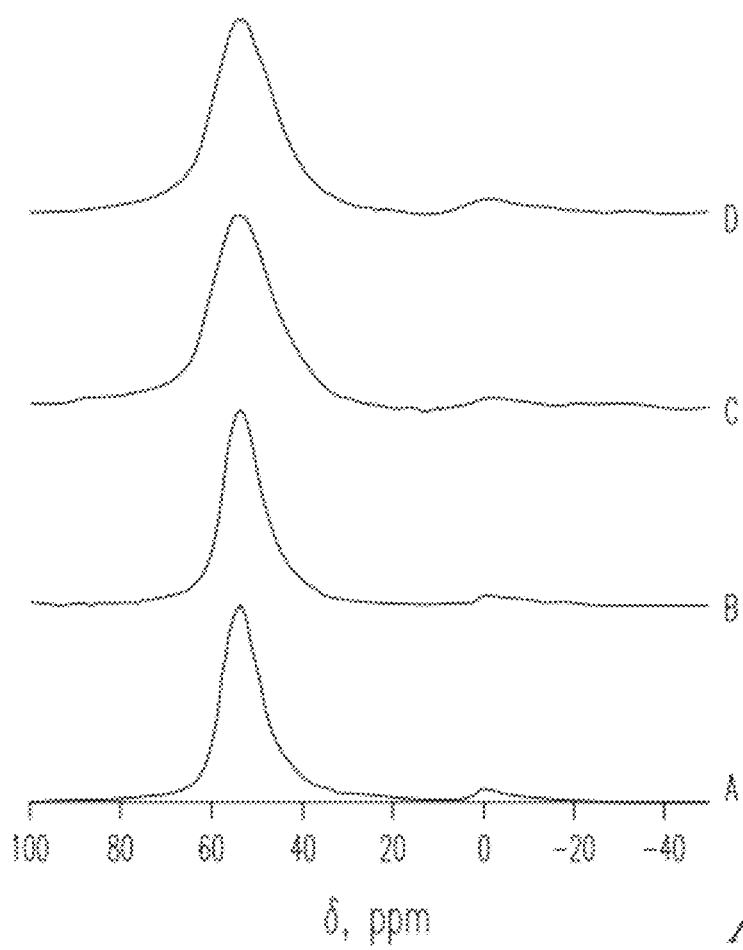
FIG. 4 shows the $^{27}$Al MAS NMR spectra of calcined ZSM-5 samples 1-N1 (22 m$^2$/g) (A), N5 (47 m$^2$/g) (B), 1-E4 (122 m$^2$/g) (C) and 1-E6 (153 m$^2$/g) (D)

Aluminum-27 MAS solid state NMR spectra were collected for select samples in order to determine the effect of particle size on the environment around the aluminum atoms in the framework. The spectra feature a strong chemical shift at 54 ppm, which corresponds to tetrahedrally coordinated aluminum present in the ZSM-5 zeolite (FIG. 4) [16]. Additionally, a weak peak was observed at 0 ppm indicating the presence of a small amount of extra framework octahedrally coordinated aluminum in the samples. The concentration of extra framework aluminum in the ZSM-5 samples was calculated by integrating the peak at 0 ppm and dividing by the combined integrated intensity of peaks at 54 and 0 ppm and did not exceed 3 at %. A decrease of the ZSM-5 particle size resulted in broadening of the tetrahedral Al peak at 54 ppm. FWHM value increased from approximately 10 ppm for samples 1-N1 and 1-N5 with $S_{ext}$ value of 22 and 47 m$^2$/g to 16 ppm in the case of samples 1-E4 and 1-E6 with $S_{ext}$ of 122 and 153 m$^2$/g respectively. The increasing linewidth with decreasing crystal size has been observed previously for nanocrystalline ZSM-5 prepared by seed silanization and was attributed to increasing heterogeneity in the Al local environments [21,25]. Linewidths of ~12-15 ppm in aluminosilicates have been previously attributed to amorphous silica-alumina materials [26]. So the increasing Al linewidth observed for our samples with the smallest particle sizes (sample 1-E-6) reflects both increasing local heterogeneity and the presence of amorphous silica-alumina materials which is also supported by decreased RC.

Figure 5:
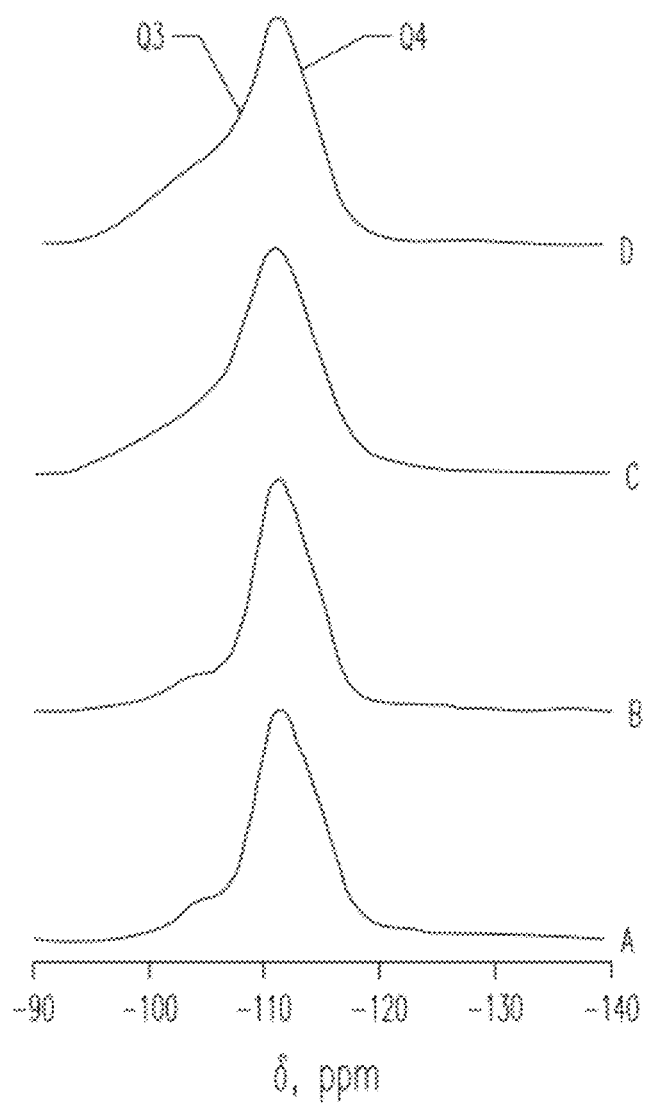
FIG. 5 shows the $^{29}$Si MAS NMR spectra of calcined ZSM-5 samples 1-N1 (22 m$^2$/g) (A), N5 (47 m$^2$/g) (B), 1-E4 (122 m$^2$/g) (C) and 1-E6 (153 m$^2$/g) (D)

Silicon-29 MAS NMR spectra (FIG. 5) were recorded for the same samples that were used for $^{27}$Al MAS NMR measurements. The spectra contain a strong peak at −111 ppm corresponding to quaternary silicon atoms (Q$^4$ 0Al) as well as a shoulder at −100 ppm due to the presence of tertiary silicon atoms (Q$^3$ 0Al) in silanol groups located on the surface of the nanocrystalline ZSM-5 and quaternary silicon atoms (Q$^4$ 1Al) with one aluminum [27]. The intensity of the peak at −100 ppm was smaller for ZSM-5 samples with lower external surface areas (FIG. 5A, B) and increased for samples with larger external surface areas (FIG. 5, C, D) reflecting increasing silanol groups as the external surface area increases. The Q$^3$ chemical shift also became broader as the external surface area of the ZSM-5 samples was increased.

Figure 12:
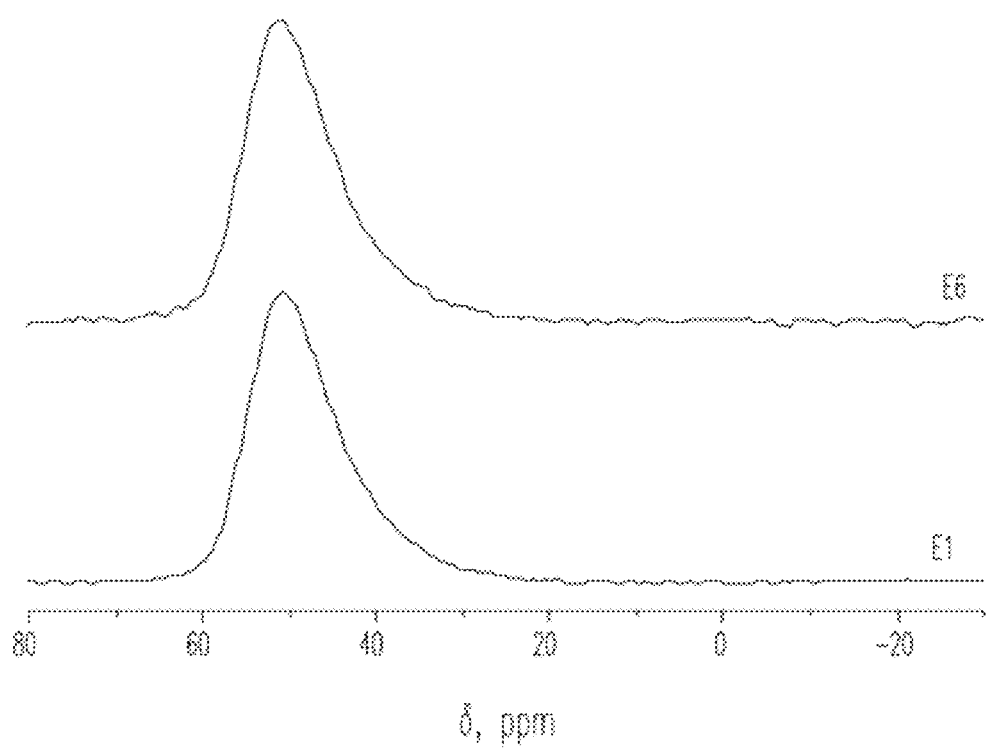
FIG. 12 shows the $^{27}$Al MAS NMR spectra of as-synthesized Naβ zeolite samples 2-E1 and 2-E6.
Figure 13:
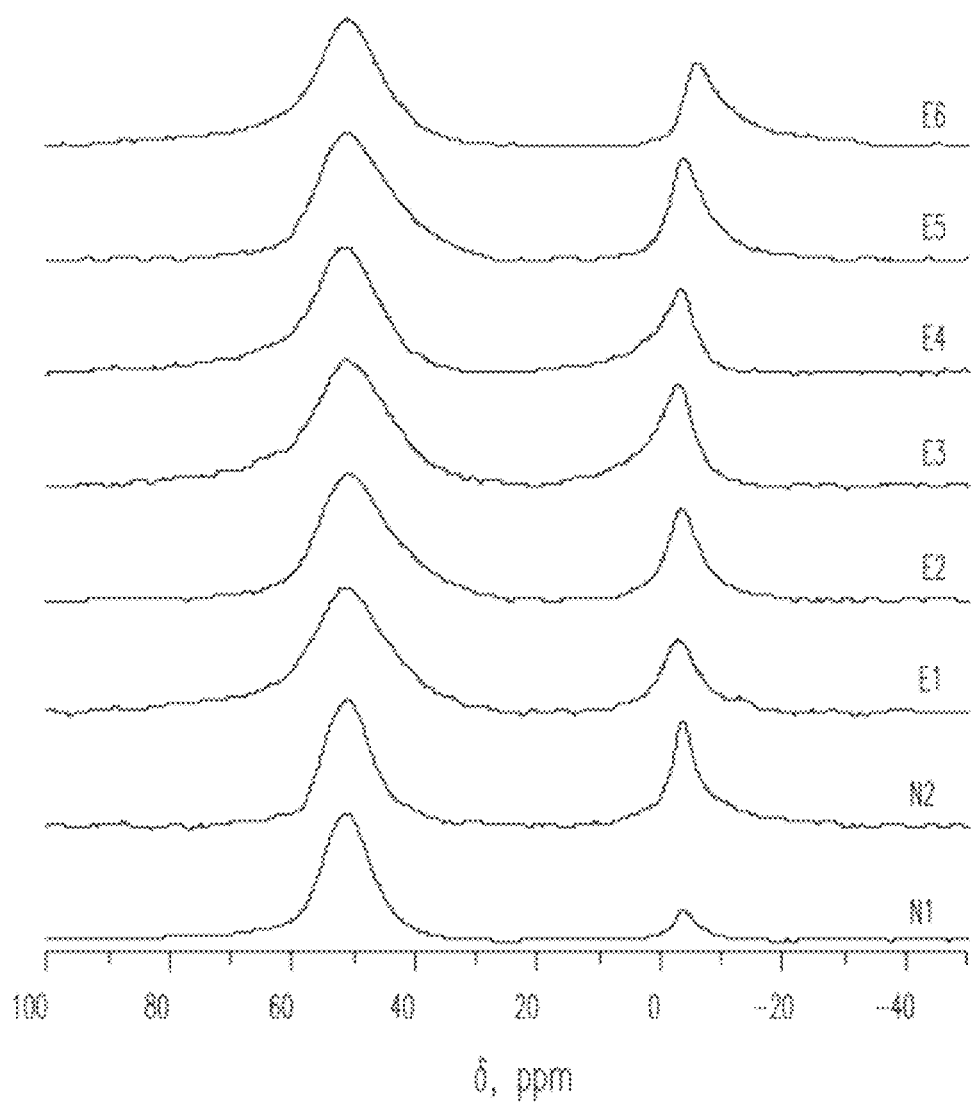
FIG. 13 shows the $^{27}$Al MAS NMR spectra of calcined Naβ samples 2-N1, 2-N2, 2-E1, 2-E2, 2-E3, 2-E4, 2-E5, and 2-E6.

$^{27}$Al and $^{29}$Si MAS NMR spectra were also recorded for zeolite Naβ. $^{27}$Al MAS NMR spectra of the zeolite beta samples were recorded under ambient conditions in order to monitor the coordination state of aluminum. In the $^{27}$Al MAS NMR spectra of as synthesized zeolite beta samples (FIG. 12), one peak is observed at approximately 51 ppm and is attributed to tetrahedrally coordinated aluminum atoms. Calcination of zeolite beta samples resulted in the appearance of a second peak at approximately 0 ppm in the $^{27}$Al MAS NMR spectra, which is assigned to aluminum in octahedral coordination (FIG. 13). The presence of a peak with a chemical shift of ~0 ppm was observed for all calcined samples and was slightly more pronounced in the case of smaller zeolite crystals (2-N2, 2-E1 to 2-E6) than in the case of the sample with largest crystal size (Sample 1-N1). Previous studies have shown that the coordination state of aluminum in calcined zeolite beta is reversible, and octahedral aluminum can be restored back into its tetrahedral coordination by treatment with ammonium nitrate [28]. Further studies of this phenomenon indicated that octahedrally coordinated aluminum remains a part of the zeolite framework and the two extra coordination bonds are formed with a water molecule and a hydronium ion [28,29]. Furthermore, the presence of Lewis acid sites in the zeolite can be beneficial for certain reactions, such as stereoselective reduction of ketones [30].

Figure 14:
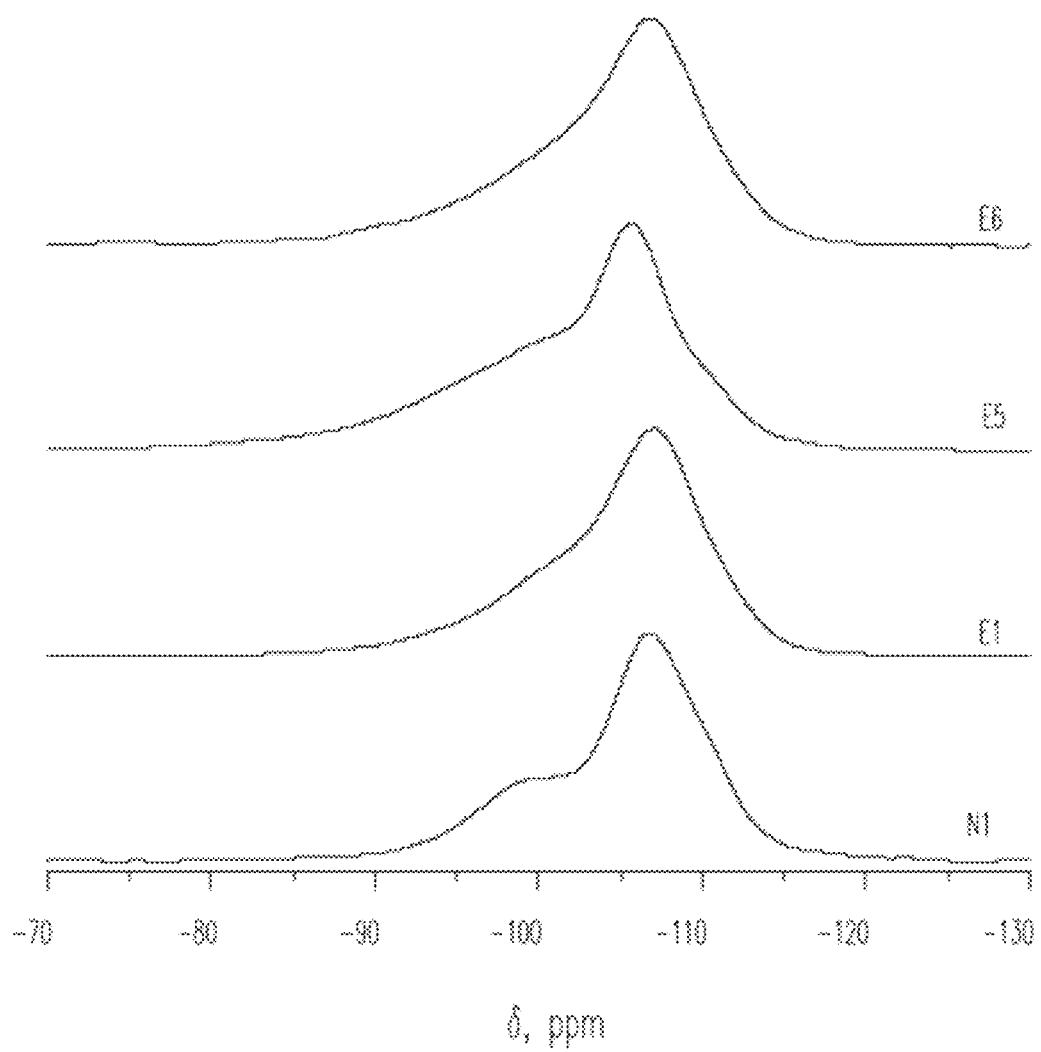
FIG. 14 shows the $^{29}$Si MAS NMR spectra of calcined Naβ samples 2-N1, 2-E1, 2-E5, and 2-E6.

$^{29}$Si MAS NMR spectra of the zeolite beta samples are shown in FIG. 14. The spectra display a strong peak at −110 ppm and a shoulder at −100 ppm, which correspond to the presence of Q$^4$ and Q$^3$ coordinated silicon atoms in the zeolite framework, respectively [49]. In the spectrum recorded for Sample 2-N1 with the smallest external surface area and largest crystal size, the Q$^3$ peak is weaker but better resolved from the Q$^4$ peak.

Decreasing the particle size broadens the Q$^3$ shoulder, while its integrated intensity increases, which is related to the increase in the number of surface silanol groups. Broadening of the Q$^3$ chemical shift is due to a decreased homogeneity of the surface silicon atoms environment in comparison with larger crystals. It should be noted that the trend in the change of Q$^3$ chemical shift intensity is similar to that observed for nanocrystalline ZSM-5 zeolite samples [56].

Transmission Electron Microscopy.

Figure 7A:
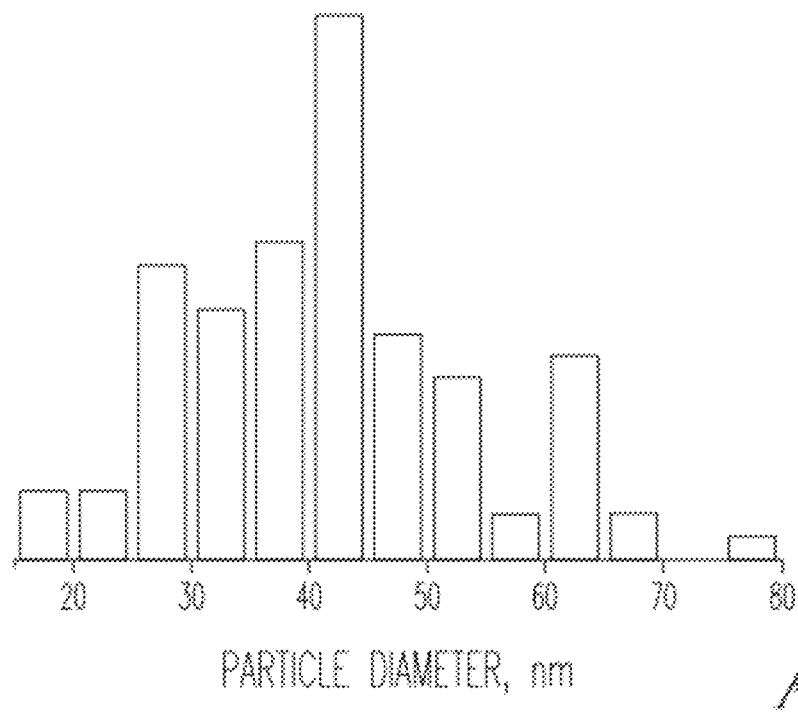
FIG. 7 shows the particle size distribution in ZSM-5 samples 1-N1 (22 m$^2$/g) (A), 1-N5 (47 m$^2$/g) (B), 1-E4 (122 m$^2$/g) (C), and 1-E6 (153 m$^2$/g) (D).
Figure 7B:
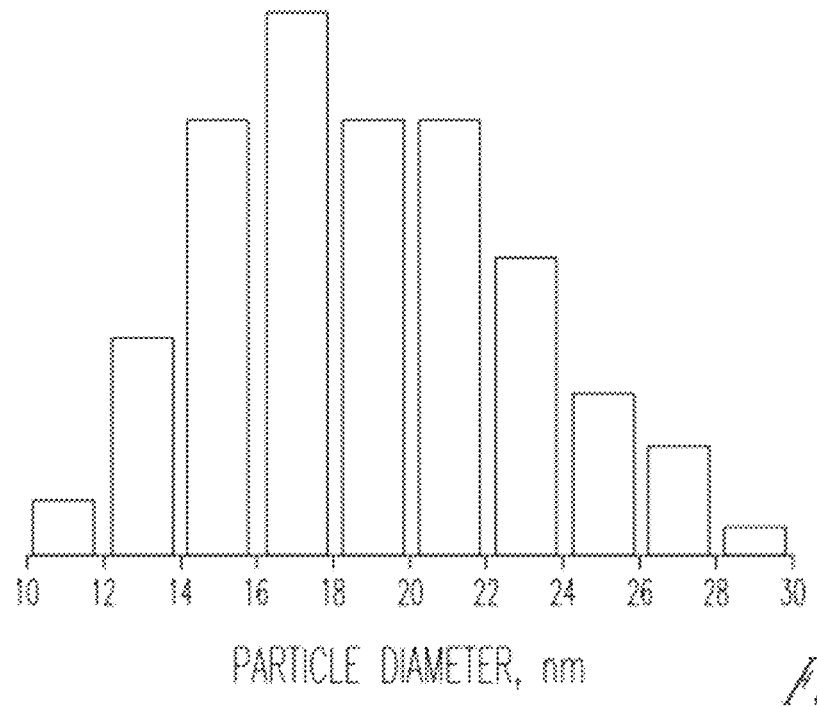
Figure 7C:
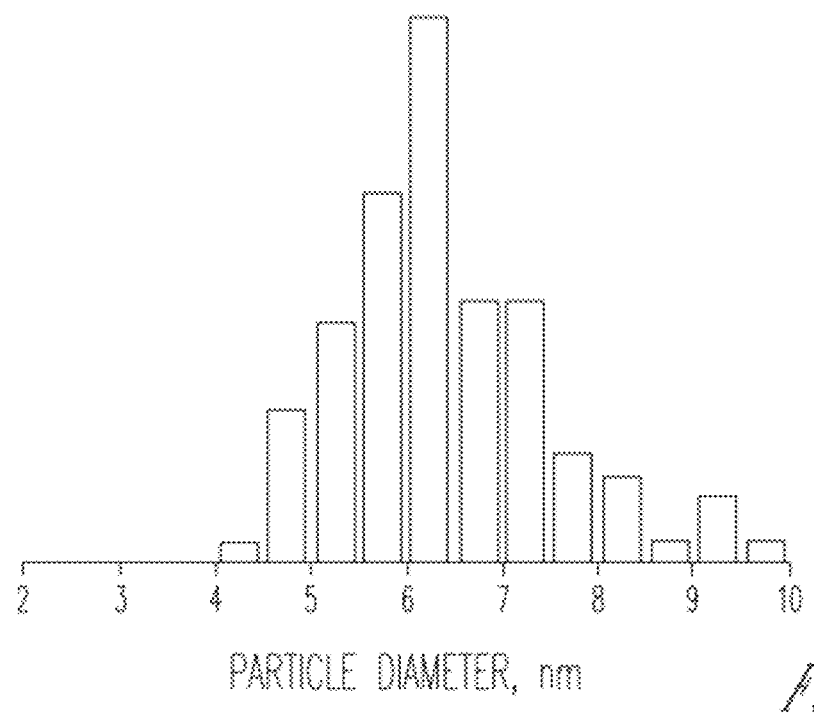
Figure 7D:
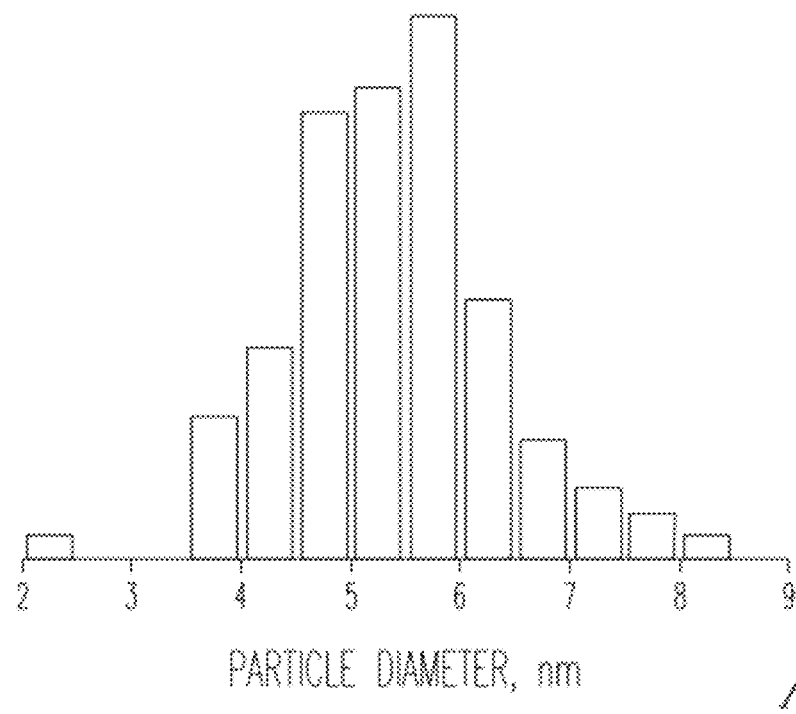

TEM images were collected for ZSM-5 zeolite samples with external surface areas of 22, 47, 122 and 153 m$^2$/g (FIG. 6). Using the TEM images to calculate size distributions (FIG. 7), the average particle size and standard deviation (shown in parenthesis) of these samples were 42 (12), 19 (3.9), 6.4 (1.2) and 5.4 (0.96) nm, respectively. The larger zeolite crystals have irregular shapes with some crystals starting to develop a typical MFI rod-shaped morphology (FIG. 6 A2). Lattice fringes can also be seen in some particles indicating a well-developed crystal framework (FIG. 6A2). The size distribution of large zeolite crystals is fairly broad and ranges from 19 to 72 nm (FIG. 7A). The individual crystals form aggregates several hundred nanometers in size (FIG. 6 A1). As the size of the individual ZSM-5 crystals decreases, their shape becomes more spherical and the size distributions more narrow (FIG. 6, B2, C2, D2 and FIG. 7).

The size distribution of crystal sizes for ZSM-5 samples with 42, 19, 6.4 and 5.4 nm average size are shown in FIG. 7A-D. Smaller crystals form aggregates, with more spherical and uniform shapes than larger crystals (FIG. 6 B1, C1, D1). The aggregate size was found to correlate with the size of individual nanocrystals. The size of ZSM-5 nanocrystal aggregates was 226 nm, 164 nm and 156 nm for single crystal sizes of 19, 6.4 and 5.4 nm, respectively.

The mesoporous aggregates of ZSM-5 nanocrystals under 10 nm in size have a striking similarity with the ZSM-5 zeolite aggregates obtained by Serrano et al. [8]. Larger size zeolites synthesized by the authors also lack mesoporosity and their aggregates have irregular shape. The size and shape of the smallest crystals, and the aggregates formed in their study, are similar in to those observed in the study reported here. However, in the case of the ZSM-5 samples synthesized in this work, the particle size and the formation of mesoporous aggregates was controlled by the reaction conditions, such as the synthesis time and the pH, as opposed to the use of an additional structure directing agent in Serrano's study. The fact that no lattice fringes were observed in the smallest zeolite crystals studied in our work is attributed to the insufficient TEM resolutions, and the powder XRD patterns confirm the presence of a crystalline phase.

Transmission electron microscopy images were also prepared for zeolite Naβ. Transmission electron microscopy images of zeolite beta samples were collected in order to determine the effect of synthesis conditions on the size and morphology of the nanocrystals and their aggregates (FIG. 17). The zeolite samples (2-E1 and 2-E6) with external surface areas of 79 and 133 m$^2$/g as well as the Samples 2-N1 and 2-N2, synthesized from diluted reaction mixture were analyzed. The aggregates of larger crystals (Sample 2-E1) are of cubical shape with smooth edges and have an average size of approximately 140 nm. The edges of the aggregates consist of layered nanocrystals, which have their lattice fringes aligned uniformly within the aggregate. The parallel lattice fringes have been observed previously for nanocrystalline zeolite beta [45].

The aggregates of smaller crystals (Sample 2-E6) have a less regular shape and their edges are rougher than in the case of the sample with larger crystals. The average size of the aggregates slightly decreases to approximately 120 nm. Lattice fringes can clearly be seen in the case of smaller crystals, and they are aligned within the aggregates as well. An individual crystal size for the Samples 2-E1 (79 m$^2$/g) and 2-E6 (133 m$^2$/g) was estimated from TEM as 40 and 16 nm, respectively. Kuechl and coworkers observed ~100 nm aggregates when using modified synthesis conditions for preparing zeolite beta with Si/Al_20 based on Camblor's study [44, 45]. Similar, but larger zeolite beta aggregates (~500 nm) are observed by Aguado and coworkers when organofunctionalized zeolite seeds were used in the zeolite beta synthesis [51].

TEM images of two zeolite beta samples synthesized from a dilute reaction mixture with pH 11.90 were collected to compare the effect of the synthesis gel concentration on the degree of aggregation of nanocrystals. Sample 2-N2 with Sext=140 m$^2$/g consists of crystals with a narrow particle size distribution of about 20 nm (FIG. 17, 2-N2). The crystals are well dispersed and do not form aggregates. Sample N1 with Sext=21 m$^2$/g formed larger particles with the average size of 200 nm. While the former sample has a large external surface area and latter sample has a convenient particle size, they lack the desired properties, such as formation of aggregates (Sample 2-N2) or sufficient external surface area (Sample 2-N1). By varying the concentration of the reaction mixture it is possible to obtain zeolite beta nanocrystals with comparable external surface areas but very different crystal morphologies (Samples 2-N2 and 2-E6).

The Effect of pH

Since the crystallization rate of the zeolites depends on the pH of the reaction mixture, varying the pH can be used to control the size and external surface of the zeolite nanocrystals. The pH of the zeolite solution should be between about 10 and 13, depending on the size of nanocrystals and mesopores desired and the zeolite being prepared.

In the preparation of ZSM-5 nanocrystals, a slower crystallization rate of the reaction mixture with pH=11.52 limits the particle size range that can be obtained under given conditions. The external surface area of the samples could only be varied between 22 and 60 m$^2$/g. This slow rate of crystallization does not allow synthesis of smaller crystals while keeping the relative crystallinity and the product yield acceptable. Partial evaporation of the reaction mixture was chosen as a means to vary the pH and crystallization rate, thus controlling the size of synthesized ZSM-5 nanocrystals.

Figure 8:
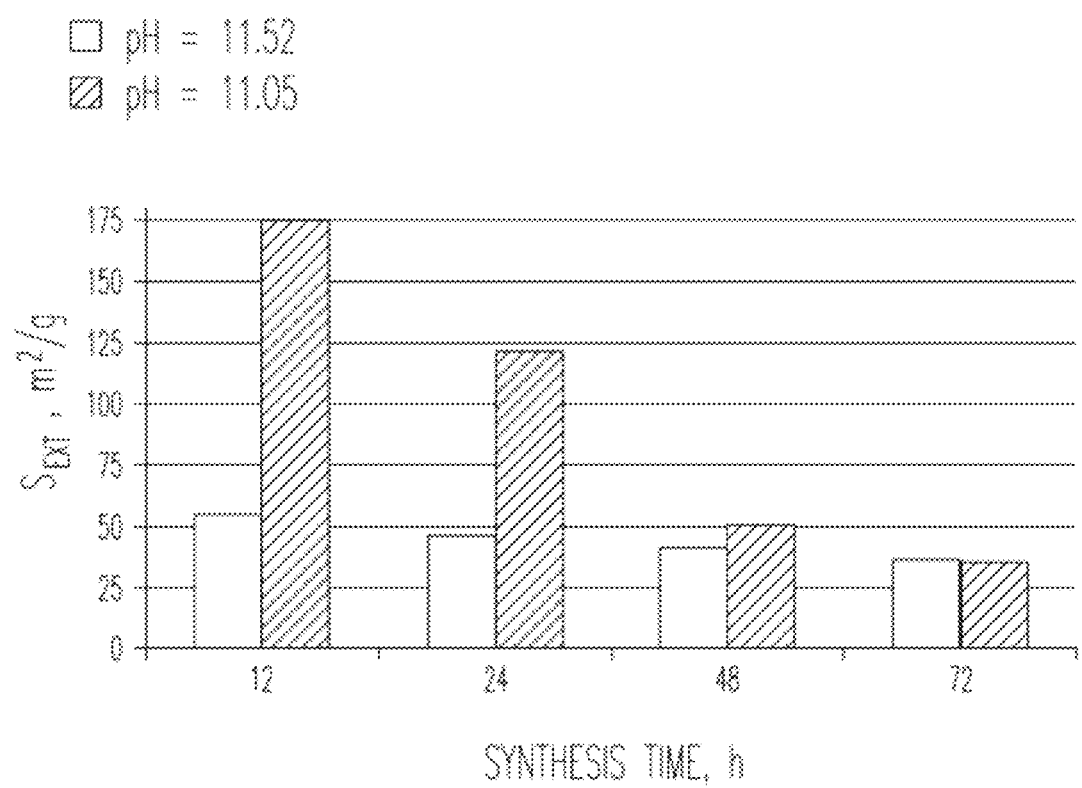
FIG. 8 compares the $S_{ext}$ values of ZSM-5 samples synthesized from reaction mixture with pH=11.52 and pH=11.05.

First, two series of samples were synthesized while systematically varying the pH by evaporation from 11.52 (non evaporated, 1-N3 to 1-N6) to 11.05 (50% evaporated, 1-E1, 1-E-2, 1-E4, 1-E7). The samples were hydrothermally treated at 140° C. for time period from 12 to 72 hours. A comparison of ZSM-5 samples synthesized at different pH values but with the same synthesis temperature and time is shown in FIG. 8. The two ZSM-5 samples synthesized with 12 hours of hydrothermal treatment from reaction mixtures with pH=11.52 and 11.05 show the largest difference between their S$_{ext}$ values. At longer synthesis time, the difference between the external surface areas of the two series of samples decreases. After 72 hours of hydrothermal treatment, the surface and pore volume parameters of both samples, as well as their relative crystallinity are similar. The higher rate of crystallization in the case of the reaction mixture with pH=11.05 leads to formation of smaller sized crystals at shorter synthesis times. Further growth of zeolite nanocrystals probably occurs through Ostwald ripening.

Figure 9:
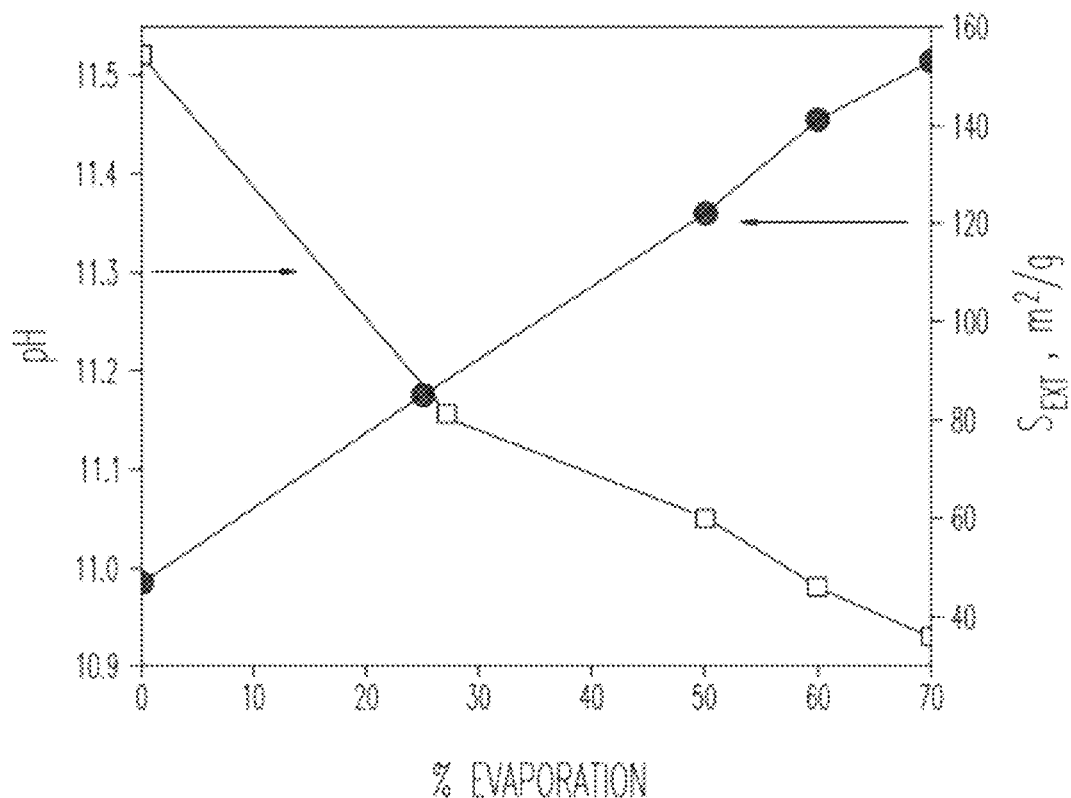
FIG. 9 shows the effect of evaporation on reaction mixture pH and external surface area of the ZSM-5 nanocrystals. The samples were synthesized at 140° C. for 24 hours.

To further investigate the role of partial reaction mixture evaporation and the pH on the crystal growth, a series of samples (1-E3 to 1-E6) was synthesized with the same hydrothermal treatment time, while the degree of evaporation was changed. The rate of crystallization steadily increases as the pH of the reaction mixture decreased from 11.52 to 10.93 (FIG. 9). The pH value has a major effect on the particle size, external surface area and pore volume of the ZSM-5 crystals. The ZSM-5 samples synthesized at lower pH have smaller sizes. Relative crystallinity and percent yield of the samples is somewhat lower compared to the non evaporated reaction mixture. One explanation of the lower RC is the increase of the amorphous particles in the sample. Another possible explanation for lower RC values of the ZSM-5 samples with the smallest crystal size is the presence of a large amount of slightly distorted surface atomic planes in the zeolite crystals due to surface relaxation. In this case, the crystallinity of ZSM-5 samples measured by XRD may be slightly underestimated.

S$_{ext}$ was previously used to estimate the crystal size of Silicalite-1, ZSM-5 and NaY zeolites [15,28,29], because S$_{ext}$ was found to correlate very well with the crystal size. The crystal size calculated from S$_{ext}$ was compared to the size measured from TEM images and found to follow the same trend. However, the average particle size calculated using S$_{ext}$ values underestimates the ZSM-5 crystal size when compared with TEM crystal size measurements (TABLE I). The difference between the particle sizes determined by the two methods is most likely due to aggregation of the ZSM-5 nanocrystals that makes a fraction of their surface areas inaccessible for nitrogen adsorption.

29-silicon MAS NMR data correlates with other methods and provides additional evidence for presence of small zeolite particles within the mesoporous aggregates. The intensity of Q$^3$ peak in the spectra increases in samples with higher surface area. Since Q$^3$ silicon atoms are only located on the external surface of the crystals, the increase of the respective chemical shift intensity indicates the presence of smaller crystals within the aggregates. The width of the Q$^3$ peak also increases in the small particles, suggesting that the environment around the surface silicon atoms is not uniform.

Figure 10:
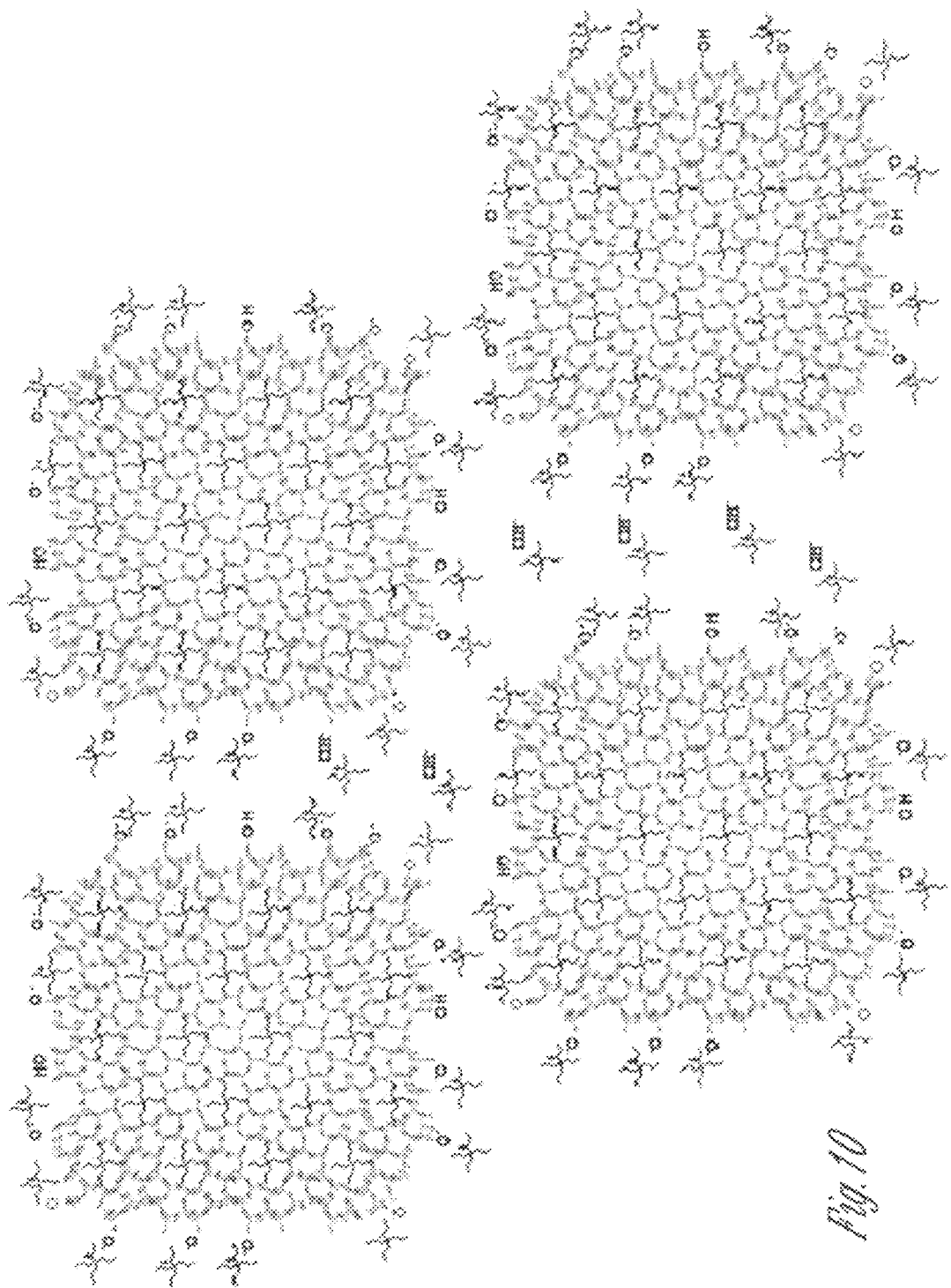
FIG. 10 represents a schematic representation of ZSM-5 nanocrystals forming mesoporous aggregates.

A proposed scheme for the formation of mesoporous aggregates of ZSM-5 is shown in FIG. 10. The surface of the zeolite crystals is negatively charged at the pH of the reaction mixture. The negatively charged surface can interact with the excess tetra-n-propylammonium cations present in the synthesis mixture. TPA$^+$ cations can electrostatically bind to the surface of the particles and participate in formation of mesopores between the nanocrystals provided the latter have a sufficiently small and uniform size. In the case of bigger ZSM-5 crystals, the effect of the TPA$^+$ cations layer around the particles does not lead to formation of mesopores because large crystals of irregular shape will stack and form macropores within the crystal aggregates.

The effect of varying the pH on the size and external surface of zeolite Naβ was also studied. The results are shown in Example 2 and in TABLE III.

EXAMPLES

The following examples are provided to illustrate the practice of the present invention and the invention is not meant to be limited thereby.

Example 1

Synthesis of ZSM-5 Zeolite Samples

ZSM-5 samples were synthesized from clear gel solutions via hydrothermal treatment. A reaction mixture of the following composition was used:

|  | TEOS | NaAlO$_2$ | TPAOH | TPABr | H$_2$O |
|---|---|---|---|---|---|
| Molar ratio | 25 | 1 | 5 | 4 | 1000 |

First, TPAOH, ⅓ of water and sodium aluminate were mixed together and stirred until sodium aluminate was completely dissolved. Then, the rest of the water and TPABr were added to the solution and stirred briefly to dissolve the solid TPABr. Next, TEOS was added to the reaction mixture which was stirred overnight at room temperature.

Some reaction mixtures were rotary evaporated at 65° C. until a certain amount of reaction mixture volume was removed. The evaporated volume was then compensated by adding appropriate amounts of deionized water. The pH of the reaction mixture was measured before and after the rotary evaporation.

The reaction mixture was then placed in a stainless steel autoclave equipped with a stirbar and PTFE liner. The synthesis was carried out at constant stirring at 250 rpm. The synthesis temperature and time were varied from 140 to 165° C. and from 12 to 72 hours, respectively. The pressure in the autoclave was that created by the pressure of the reactants at the temperature used.

After synthesis, zeolite crystals were separated from the supernatant by centrifugation at 14000 rpm for 15 minutes. Ethanol or water was added to the solid and the resulting suspension was sonicated for 1 hour until the entire solid was redispersed, followed by centrifugation at 14000 rpm for 15 minutes. The washing was done twice with water and once with ethanol. After the final washing, the solid was redispersed in ethanol after sonication and the slurry was dried in an oven at 70° C. overnight.

Samples were then calcined at 600° C. for 6 hours in air to remove organic templates.

Instrumentation

Powder X-ray diffraction patterns (Siemens D5000 X-ray diffractometer with Cu Kα and nickel filter) were collected from 2θ=5 to 55 with a 0.04 step size and 1 s/step. After a background correction, the peaks between 2θ=22.5 and 25 were integrated to calculate the relative crystallinity (RC) of the samples compared to a commercially available ZSM-5 zeolite (Zeolyst).

Surface areas of the parent and calcined nanocrystalline ZSM-5 material were measured using the BET method on a Nova 1200 Nitrogen Adsorption Instrument (Quantachrome). Typically, 100 mg of zeolite powder was dried overnight at 120° C. in vacuum. A 7-point BET isotherm was then recorded and the specific surface area was calculated for the samples before and after calcination in order to obtain the external ($S_{ext}$) and total specific surface areas ($S_{tot}$) respectively. The external surface area ($S_{ext}$) value was also used to evaluate the size of crystals according to a previously derived formula [15], x=3216/$S_{ext}$ where x is the ZSM-5 crystal size in nm and $S_{ext}$ is the measured external specific surface area in m$^2$/g assuming cubic crystals. A 50 point adsorption/desorption isotherm was measured and used for calculation of micropore and total pore volume as well as the average diameter of mesopores. The total pore volume ($V_{tot}$) was calculated by measuring the amount of adsorbed nitrogen at 0.97 P/P$_o$. The t-plot method was used to calculate the micropore volume ($V_{micro}$). The mesopore volume ($V_{meso}$) was calculated from the difference between the $V_{tot}$ and $V_{micro}$. The size distribution of mesopores in the zeolite samples was calculated using a Barret, Joyner and Halenda (BJH) model [24].

Elemental composition of the solids was determined by inductively coupled plasma optical emission spectroscopy (Varian 720-OES). The solids were prepared for analysis in the following manner: 10 mg of zeolite powder was placed in a plastic tube. 1.6 mL of 70:30 HCl:HF solution was added to the tube and the suspension was sonicated for 15 minutes until all of the solid was completely dissolved. Then, 0.6 mL of concentrated nitric acid and 6 mL of 5% boric acid solutions were added, and the total volume was adjusted to 10 mL with DI water. Three replicate solutions were prepared for each sample.

A 300 MHz (6.9 T) wide bore magnet spectrometer (Varian) with a TecMag Discovery Console was used to record $^{27}$Al and $^{29}$Si magic angle spinning nuclear magnetic resonance (MAS NMR). Aluminum-27 spectra were recorded at the Larmor frequency of 78.209 MHz. 70 mg of powder was loaded in a 4 mm zirconia rotor and spun in a Chemagnetics pencil probe at 12 kHz. The spectra were acquired with 12000 scans, 3 μs pulse width and 3 s pulse delays. $^{29}$Si MAS NMR spectra were recorded at a Larmor frequency of 59.621 MHz. Approximately 250 mg of sample was loaded in a 7 mm zirconia rotor and spun in a Chemagnetics pencil probe at 7 kHz. A total of 1000 scans were acquired 4 μs pulse width and 60 s pulse delays.

For TEM imaging (JEOL JEM-1230 Transmission Electron Microscope), a drop of dilute sample suspension in methanol was placed on a carbon coated copper grid (Ted Pella) and dried at room temperature prior to the measurement.

TABLE I

Summary of synthesis and characterization of nanocrystalline ZSM-5.

| Sample name | T, °C. | Time hr | % evap | pH | $S_{ext}$, m$^2$/g* | $S_{int}$, m$^2$/g* | $S_{tot}$, m$^2$/g* | RC, % | $V_{micro}$, cc/g* | $V_{meso}$, cc/g* | $V_{tot}$, cc/g* | Si/Al | Yield, % |
|---|---|---|---|---|---|---|---|---|---|---|---|---|---|
| 1-N1 | 155 | 72 | 0 | 11.52 | 22 | 298 | 320 | 96 | 0.127 | 0.085 | 0.212 | 31 (0.8) | 83 |
| 1-N2 | 165 | 48 | 0 | 11.52 | 31 | 300 | 331 | 102 | 0.134 | 0.136 | 0.270 | 31 (0.3) | 84 |
| 1-N3 | 140 | 72 | 0 | 11.52 | 36 | 309 | 345 | 103 | 0.148 | 0.116 | 0.264 | 28 (0.1) | 94 |

TABLE I-continued

Summary of synthesis and characterization of nanocrystalline ZSM-5.

| Sample name | T, °C. | Time hr | % evap | pH | $S_{ext}$, m²/g* | $S_{int}$, m²/g* | $S_{tot}$, m²/g* | RC, % | $V_{micro}$, cc/g* | $V_{meso}$, cc/g* | $V_{tot}$, cc/g* | Si/Al | Yield, % |
|---|---|---|---|---|---|---|---|---|---|---|---|---|---|
| 1-N4 | 140 | 48 | 0 | 11.52 | 42 | 311 | 353 | 98 | 0.145 | 0.136 | 0.281 | 29 (0.2) | 86 |
| 1-N5 | 140 | 24 | 0 | 11.52 | 47 | 306 | 353 | 99 | 0.148 | 0.138 | 0.286 | 29 (0.7) | 86 |
| 1-N6 | 140 | 12 | 0 | 11.52 | 56 | 300 | 356 | 89 | 0.142 | 0.139 | 0.281 | 27 (1.1) | 59 |
| 1-N7 | 135 | 12 | 0 | 11.52 | 60 | 299 | 359 | 93 | 0.149 | 0.151 | 0.300 | 27 (0.4) | 53 |
| 1-E1 | 140 | 72 | 50 | 11.05 | 35 | 313 | 348 | 101 | 0.135 | 0.162 | 0.297 | 30 (0.5) | 73 |
| 1-E2 | 140 | 48 | 50 | 11.05 | 51 | 311 | 362 | 99 | 0.151 | 0.135 | 0.286 | 28 (1.3) | 95 |
| 1-E3 | 140 | 24 | 25 | 11.16 | 85 | 304 | 389 | 76 | 0.134 | 0.244 | 0.378 | 29 (0.8) | 75 |
| 1-E4 | 140 | 24 | 50 | 11.05 | 122 | 298 | 420 | 74 | 0.104 | 0.43 | 0.534 | 30 (0.1) | 74 |
| 1-E5 | 140 | 24 | 60 | 10.98 | 141 | 299 | 440 | 70 | 0.109 | 0.418 | 0.527 | 23 (2.2) | 86 |
| 1-E6 | 140 | 24 | 70 | 10.93 | 153 | 287 | 440 | 61 | 0.102 | 0.359 | 0.461 | 27 (0.5) | 72 |
| 1-E7 | 140 | 12 | 50 | 11.05 | 175 | 264 | 439 | 63 | 0.115 | 0.351 | 0.466 | 27 (0.7) | 42 |

*The estimated measurement error is <10%

TABLE II

Summary of Synthesis and Characterization of Nanocrystalline ZSM-5.

| Sample name | Crystal size, nm** | TEM crystal size, nm |
|---|---|---|
| 1-N1 | 146 | 42 |
| 1-N2 | 104 | — |
| 1-N3 | 89 | — |
| 1-N4 | 77 | — |
| 1-N5 | 68 | 19 |
| 1-N6 | 57 | — |
| 1-N7 | 54 | — |
| 1-E1 | 92 | — |
| 1-E2 | 63 | — |
| 1-E3 | 38 | — |
| 1-E4 | 26 | 6.4 |
| 1-E5 | 23 | — |
| 1-E6 | 21 | 5.4 |
| 1-E7 | 18 | — |

**The crystal size was calculated from BET $S_{ext}$ value according to reference 15.

Example 2

Synthesis of Naβ Zeolite Samples

The synthesis of hierarchal Naβ zeolite synthesis is similar to that described above for mesoporous ZSM-5. An additional synthesis parameter used in the Naβ zeolite synthesis is the concentration of the reaction mixture, which is an important factor for the crystallization rate of the Naβ zeolite. The general trends observed for mesoporous ZSM-5 zeolite are also observed for Naβ. The Naβ aggregate size varies slightly depending on the individual crystal size and the lattice fringes of individual zeolite crystals can be clearly seen suggesting that the material is highly crystalline.

The synthesis gels were rotary evaporated in order to remove the ethanol produced during hydrolysis of TEOS as well as some water, and to increase the concentration of the reacting species in the gel. The concentration of the synthesis gel was then adjusted to the value that was found optimal for micro/mesopore composites synthesis and to the initial volume in order to provide insight into the effect of synthesis gel concentration on the zeolite crystallization process. Synthesis gels with higher concentration produced an amorphous gel after hydrothermal treatment while greater dilution resulted in a slower rate of crystallization as well as the absence of nanocrystal aggregation into mesoporous composites.

The initial pH of the synthesis gel was 12.31. Partial rotary evaporation and subsequent adjustment of synthesis gel volume to 50% of the initial volume resulted in a decrease of pH to 12.18. The samples synthesized from the synthesis gel with pH 12.18 are labeled as E series. Adjustment of the volume to 100% of the initial volume after rotary evaporation further decreased the pH to 11.91, and the reaction mixtures with this pH were used to synthesize the N series of samples. The decrease of pH after partial rotary evaporation and volume adjustment may be due to the solvent effect, as the ethanol is removed from the reaction mixture. It may also be attributed to a loss of a small amount of the template cations during the evaporation process.

Naβ samples were synthesized from clear gel solutions via hydrothermal treatment. A reaction mixture of the following composition was used:

| | TEOS | NaAlO$_2$ | TEAOH | TEABr | H$_2$O |
|---|---|---|---|---|---|
| Molar ratio | 25 | 1 | 10 | 10 | 1000 |

Tetra-ethylammonium hydroxide (TEAOH), water and sodium aluminate (NaAlO$_2$) were mixed together and stirred until sodium aluminate was completely dissolved. Then, tetra-ethylammonium bromide (TEABr) was added to the solution and stirred briefly to dissolve the solid TEABr. Tetraethylorthosilicate (TEOS) was then added to the reaction mixture which was stirred overnight at room temperature.

The reaction mixtures were rotary evaporated at 65° C. until 75% of the initial volume was removed. The reaction mixture was then diluted with appropriate amounts of deionized water. The pH of the reaction mixture was measured before and after the rotary evaporation.

The reaction mixture was then placed in a stainless steel autoclave equipped with a stirbar and PTFE liner. The synthesis was carried out at constant stirring at 250 rpm. The synthesis temperature and time were varied from 115 to 150° C. and from 16 to 46 hours, respectively. The pressure in the autoclave was that created by the pressure of the reactants at the temperature used.

After synthesis, zeolite crystals were separated from the supernatant by centrifugation at 14000 rpm for 15 minutes. Ethanol or water was added to the solid and the resulting suspension was sonicated for 1 hour until the entire solid was redispersed, followed by centrifugation at 14000 rpm for 15 minutes. The washing was done twice with water and once with ethanol. After the final washing, the solid was redispersed in ethanol after sonication and the slurry was dried in an oven at 70° C. overnight.

Samples were then heated at 1.6°/min to 600° C. and calcined for 6 hours in air to remove organic templates.

The synthesis yield of calcined zeolite material (TABLE III) was approximately 60-65% of the total theoretical yield, and around 50% for the samples with smallest particle size in both series. These values are somewhat lower than the yields that were observed during synthesis of mesoporous ZSM-5 zeolite [27], but comparable to yields obtained for similar zeolite beta materials [51].

Instrumentation.

Powder X-ray diffraction patterns (Siemens D5000 X-ray diffractometer with Cu Kα and nickel filter) were collected from 2θ=5 to 55 with a 0.04 step size and 1 s/step. After a background correction, the peaks between 2θ=20 and 24 were integrated to calculate the relative crystallinity (RC) of the samples compared to a commercially available Naβ zeolite (Zeolyst).

Surface areas of the parent and calcined nanocrystalline Naβ material were measured using the BET method on a Nova 4200 Nitrogen Adsorption Instrument (Quantachrome). Typically, 100 mg of zeolite powder was dried overnight at 120° C. in vacuum. A 7-point BET isotherm was then recorded and the specific surface area was calculated for the samples before and after calcination in order to obtain the external ($S_{ext}$) and total specific surface areas ($S_{tot}$) respectively. The external surface area ($S_{ext}$) value was also used to evaluate the size of crystals according to a derived formula, $x=3879/S_{ext}$ where x is the Naβ crystal size in nm and $S_{ext}$ is the measured external specific surface area in $m^2/g$ assuming cubic crystals. A 50 point adsorption/desorption isotherm was measured and used for calculation of micropore and total pore volume as well as the average diameter of mesopores. The total pore volume ($V_{tot}$) was calculated by measuring the amount of adsorbed nitrogen at 0.99 $P/P_o$. The t-plot method was used to calculate the micropore volume ($V_{micro}$). The mesopore volume ($V_{meso}$) was calculated from the difference between the $V_{tot}$ and $V_{micro}$. The size distribution of mesopores in the zeolite samples was calculated using a Barret, Joyner and Halenda (BJH) model [53].

Elemental composition of the solids was determined by inductively coupled plasma optical emission spectroscopy (Varian 720-OES). The solids were prepared for analysis in the following manner: 10 mg of zeolite powder was placed in a plastic tube. 1.6 mL of 70:30 HCl:HF solution was added to the tube and the suspension was sonicated for 15 minutes until all of the solid was completely dissolved. Then, 0.6 mL of concentrated nitric acid and 6 mL of 5% boric acid solutions were added, and the total volume was adjusted to 10 mL with DI water. Three replicate solutions were prepared for each sample.

A 300 MHz (6.9 T) wide bore magnet spectrometer (Varian) with a TecMag Discovery Console was used to record $^{27}Al$ and $^{29}Si$ magic angle spinning nuclear magnetic resonance (MAS NMR). Aluminum-27 spectra were recorded at the Larmor frequency of 78.209 MHz. 70 mg of powder was loaded in a 4 mm zirconia rotor and spun in a Chemagnetics pencil probe at 12 kHz. The spectra were acquired with 2048 scans, 3 µs pulse width and 3 s pulse delays. $^{29}Si$ MAS NMR spectra were recorded at a Larmor frequency of 59.621 MHz. Approximately 250 mg of sample was loaded in a 7 mm zirconia rotor and spun in a Chemagnetics pencil probe at 7 kHz. A total of 1000 scans were acquired 4 µs pulse width and 60 s pulse delays.

For TEM imaging (JEOL JEM-1230 Transmission Electron Microscope), a drop of dilute sample suspension in methanol was placed on a carbon coated copper grid (Ted Pella) and dried at room temperature prior to the measurement The invention has been described in detail with particular reference to certain preferred embodiments thereof, but it will be understood that variations and modifications can be effected within the spirit and scope of the invention.

TABLE III

Characterization summary of mesoporous nanocrystalline Naβ samples.

| Sample | T °C. | Time hrs | V/Vi % | pH | Yield % | Sext $m^2/g$ | Stotal $m^2/g$ | Smicro $m^2/g$ | Vtotal cc/g | Vmicro cc/g | Vmeso cc/g | Si/Al | RC % | BET size nm* |
|---|---|---|---|---|---|---|---|---|---|---|---|---|---|---|
| 2-N1 | 150 | 72 | 100 | 11.9 | 74 | 21 | 487 | 466 | 0.559 | 0.306 | 0.253 | 19 | 94 | 155 |
| 2-N2 | 135 | 96 | 100 | 11.9 | 50 | 140 | 590 | 450 | 0.672 | 0.196 | 0.476 | 18 | 102 | 23 |
| 2-E1 | 130 | 30 | 50 | 12.18 | 58 | 79 | 649 | 570 | 0.647 | 0.233 | 0.414 | 19 | 99 | 41 |
| 2-E2 | 150 | 20 | 50 | 12.19 | 68 | 83 | 611 | 528 | 0.634 | 0.233 | 0.401 | 16 | 104 | 39 |
| 2-E3 | 145 | 20 | 50 | 12.18 | 65 | 91 | 602 | 511 | 0.589 | 0.231 | 0.358 | 18 | 94 | 39 |
| 2-E4 | 135 | 20 | 50 | 12.18 | 61 | 99 | 672 | 573 | 0.731 | 0.222 | 0.511 | 19 | 99 | 33 |
| 2-E5 | 125 | 30 | 50 | 12.18 | 62 | 105 | 645 | 540 | 0.631 | 0.231 | 0.400 | 19 | 92 | 31 |
| 2-E6 | 120 | 34 | 50 | 12.18 | 47 | 133 | 647 | 514 | 0.651 | 0.217 | 0.434 | 18 | 92 | 24 |

*BET is the particle size estimated form the Sext value assuming cubical particle shape.

REFERENCES

[1] S. Kotrel, M. P. Rosynek, J. H. Lunsford. J. Catal., 191 (2000) 55-61.

[2] X. Li, C. Li, J. Zhang, C. Yang, H. Shan. J. Nat. Gas Chem., 16 (2007) 92-99.

[3] H. T. Yan, R. Le Van Mao. App. Catal. A: Gen., 375 (2010) 63-69.

[4] C. Liu Y. Deng, Y. Pan, Y. Gu., B. Qiao, X. Gao. J. Molec. Catal. A: Chem., 215 (2004) 195-199

[5] A. K. Aboul-Gheit, A. E. Awadallah, N. A. K. Aboul-Gheit, El-Sayed A. Solyman, M. A. Abdel-Aaty. App. Catal. A: Gen., 334 (2008) 304-310

[6] Larsen, Sarah C. J. Phys. Chem. C., 111 (2007) 8464-8474

[7] L. Tosheva, V. Valtchev. Chem. Mater., 17 (2005) 2494-2513

[8] D. P. Serrano, R. van Grieken, J. A. Melero, A. Garcia, C. Vargas. J. Molec. Catal. A: Chem., 318 (2010) 68-74

[9] M. Choi, K. Na, J. Kim, Y. Sakamoto, O. Terasaki, R. Ryoo. Nature, 461 (2009) 246-249

[10] M. Firoozi, M. Baghalha, M. Asadi. Catal. Commun., 10 (2009) 1582-1585

[11] J. Kim, M. Choi, R. Ryoo. J. Catal., 269 (2010) 219-228

[12] R. Caicedo-Realpe, J. Pérez-Ramírez. Micropor. Mesopor. Mater., 128 (2010) 91-100

[13] M. Ogura. Catal. Surv. Asia, 12 (2008) 16-27

[14] R. M. Mohamed, O. A. Ismail, I. A. Ibrahim. Mater. Lett., 59 (2005) 3441-3444

[15] W. Song, R. E. Justice, C. A. Jones, V. H. Grassian, S. C. Larsen. Langmuir, (2004) 8301-8306

[16] G. Majano, A. Darwiche, S. Mintova, V. Valtchev. Ind. Eng. Chem. Res., 48 (2009) 7084-7091

[17] H. Zhu, Z. Liu, D. Kong, Y. Wang, X. Yuan, Z. Xie. J. Coll. Interface Sci., 331 (2009) 432-438

[18] H. Xin, A. Koekkoek, Q. Yang, R. van Santen, C. Li. E. J. M. Hensen. Chem. Commun., (2009) 7590

[19] C. Li, Y. Wang, B. Shi, J. Ren, X. Liu, Y. Wang, Y. Guo, Y. Guo, G. Lu. Micropor. Mesopor. Mater., 117 (2009) 104-110

[20] R. Srivastava, N. Iwasa, S. Fujita, M. Arai. Chem. Eur. J. 14 (2008) 9507-9511

[21] D. P. Serrano, J. Aguado, G. Morales, J. M. Rodriguez, A. Peral, M. Thommes, J. D. Epping, B. F. Chmelka. Chem. Mater. 21 (2009) 641-654.

[22] Y. Fang, H. Hu, G. Chen. Chem Mater., 20 (2008) 1670-1672.

[23] Y. Tao, H. Kanoh, L. Abrams, K. Kaneko. Chem. Rev., 106 (2006) 896-910.

[24] E. P. Barret, L. G. Joyner, P. P. Halenda. J. Am. Chem. Soc. 73 (1951) 373-380

[25] D. P. Serrano, J. Aguado, J. M. Escola, J. M. Rodriguez, A. Peral. Chem. Mater., 18 (2006) 2462-2464

[26] E. Oldfield, J. Haase, K. D. Schmitt, S. E. Schramm. Zeolites, 14 (1994) 101-109.

[27] N. C. M. Alma, G. R. Hays, A. V. Samoson, E. T. Lippmaa. Anal. Chem. 56 (1984) 729-733

[28] W. Song, G. Li, V. H. Grassian, S. C. Larsen. Environ. Sci. Technol. 39 (2005) 1214-1220

[29] W. Song, R. E. Justice, C. A. Jones, V. H. Grassian, S. C. Larsen. Langmuir, 20 (2004) 4696-4702

[30] S. Mintova, V. Valtchev, T. Onfroy, C. Marichal, H. Knozinger, T. Bein, Micropor. Mesopor. Mater. 90 (2006) 237-245.

[31] S. Loiha, K. Fottinger, K. Zorn, W. Klysubun, G. Rupprechter, J. Wittayakun, J. Ind. Eng. Chem. 15 (2009) 819-823.

[32] B. Modhera, M. Chakraborty, P. A. Parikh, H. C. Bajaj, Catal. Lett. 132 (2009) 168-173.

[33] Y. Nie, S. Jaenicke, G.-K. Chuah, Chem. Eur. J. 15 (2009) 1991-1999.

[34] L. Ding, Y. Zheng, H. Yang, R. Parviz, Appl. Catal. A: General 353 (2009) 17-23.

[35] J. Pérez-Ramírez, C. H. Christensen, K. Egeblad, C. H. Christensen, J. C. Groenef, Chem. Soc. Rev. 37 (2008) 2530-2542.

[36] G. J. de A. A. Soler-Illia, S. Clement, L. Benedicte, P. Joel, Chem. Rev. 102 (2002) 4093-4138.

[37] J.-N. Park, J. Wang, S.-I. Hong, C. W. Lee, Appl. Catal. A: General 202 (2005) 68-75.

[38] M. Ogura, S. Shinomiya, J. Tateno, Y. Nara, M. Nomura, E. Kikuchi, M. Matsukata, Appl. Catal. A: General 219 (2001) 33-43.

[39] S. Abello, A. Bonilla, J. Perez-Ramirez, Appl. Catal. A: General 364 (2009) 191-198.

[40] D. Verboekend, J. C. Groen, J. Pérez-Ramírez, Adv. Funct. Mater. 20 (2010) 1441-1450.

[41] J. Pérez-Ramírez, S. Abelló, A. Bonilla, J. C. Groen, Adv. Funct. Mater. 19 (2009) 164-172.

[42] Y. H. Chou, C. S. Cundy, A. A. Garforth, V. L. Zholobenko, Micropor. Mesopor. Mater. 89 (2006) 78-87.

[43] G. D. Mohr, M. J. G. Janssen. US Patent 2001/0002426, May 31, 2001.

[44] M. A. Camblor, A. Corma, S. Valencia, Micropor. Mesopor. Mater. 25 (1998) 59-74.

[45] D. E. Kuechl, A. I. Benin, L. M. Knight, H. Abrevaya, S. T. Wilson, W Sinkler, T. M. Mezza, R. R. Willis, Micropor. Mesopor. Mater. 127 (2010) 104-118.

[46] Y. Tong, T. Zhao, F. Li, Y. Wang, Chem. Mater. 18 (2006) 4218-4220.

[47] V. P. Valtchev, M. Smaihi, A.-C. Faust, L. Vidal, Chem. Mater. 16 (2004) 1350-1355.

[48] Q. Lei, T. Zhao, F. Li, Y. F. Wang, L. Hou, J. Porous. Mater. 15 (2008) 643-646.

[49] S. A. Bagshaw, N. I. Baxter, D. R. M. Brew, C. F. Hosie, N. Yuntong, S. Jaenicke, C. G. Khuan, J. Mater. Chem. 16 (2006) 2235-2244.

[50] H. Xu, J. Guan, S. Wu, Q. Kan, J. Coll. Int. Sci. 329 (2009) 346-350.

[51] J. Aguado, D. P. Serrano, J. M. Rodriguez, Micropor. Mesopor. Mater. 115 (2008) 504-513.

[52] Y. Fang, H. Hu, G. Chen, Chem. Mater. 20 (2008) 1670-1672.

[53] S.-P. Liu, L. Chen, Y. M. Wang, Solid State Sci. 12 (2010) 1070-1075.

[54] Y. Tao, H. Kanoh, L. Abrams, K. Kaneko, Chem. Rev. 106 (2006) 896-910.

[55] ASTM D5758-01, American Society for Testing and Materials, 2001.

[56] Petushkov, S. Yoon, S. C. Larsen, Micropor. Mesopor. Mater. 137 (2010) 92-100.

[57] E. Bourgeat-Lami, P. Massiani, F. D. Renzo, F. Fajula, T. D. Courrieres, Catal. Lett. 5 (1990) 265-272.

[58] L. C. de Menorval, W. Buckermann, F. Figueras, F. Fajula, J. Phys. Chem. 100 (1996) 465-467.

[59] P. J. Kunkeler, B. J. Zuurdeeg, J. C. van der Waal, J. A. van Bokhoven, D. C. Koningsberger, H. van Bekkum, J. Catal. 180 (1998) 234-244.

[60] W. Song, R. E. Justice, C. A. Jones, V. H. Grassian, S. C. Larsen, Langmuir 20 (2004) 83.

[61] N. D. Hould, S. Kumar, M. Tsapatsis, V. Nikolakis, R. F. Lobo, Langmuir 26 (2010) 1260-1270.

[62] A. Petushkov, Synthesis and Characterization of Nanocrystalline and Mesoporous Zeolites, Ph.D. Thesis, March 2011.

We claim:

1. A method of preparing mesoporous nanocrystalline zeolite comprising:
    (a) contacting a silicon source, a single mono-ammonium organic template, and an aluminum source, in a solvent, for a period of time sufficient to produce a zeolite gel by hydrolysis;
    (b) adjusting the concentration and pH of the zeolite gel by evaporating 50% to 100% of the solvent;

(c) heating the zeolite gel, at a temperature and pressure sufficient to produce mesoporous nanocrystalline zeolite crystals;

(d) separating the mesoporous nanocrystalline zeolite crystals;

(e) washing and drying the mesoporous nanocrystalline zeolite crystals; and (f) calcining the mesoporous nanocrystalline zeolite crystals to remove the template from the mesoporous nanocrystalline zeolite crystals.

2. The method of claim 1, wherein the zeolite is zeolite ZSM-5.

3. The method of claim 2, wherein the size of the zeolite ZSM-5 nanocrystals is between about 6 to about 40 nm.

4. The method of claim 2, wherein the total surface area ($S_{tot}$) of the zeolite ZSM-5 is from about 320 to about 440 $m^2/g$.

5. The method of claim 2, wherein the internal surface area ($S_{int}$) of the zeolite ZSM-5 is from about 264 to about 313 $m^2/g$.

6. The method of claim 2, wherein the external surface area ($S_{ext}$) of the zeolite ZSM-5 is from about 20 to about 200 $m^2/g$.

7. The method of claim 2, wherein the mesopore volume ($V_{meso}$) of the zeolite ZSM-5 is from about 0.085 cc/g to about 0.43 cc/g.

8. The method of claim 2, wherein the heating is carried out at a temperature of from about 140 to about 165° C. for about 12 to 72 hours.

9. The method of claim 2, wherein the zeolite ZSM-5 zeolites are formed at a pH of from about 10.93 to about 11.52.

10. The method of claim 2, wherein the diameter of the zeolite ZSM-5 mesopores is between about 4 to about 12 nm.

11. The method of claim 2, wherein the micropore volume ($V_{micro}$) of the zeolite ZSM-5 is from about 0.102 to about 0.151 cc/g.

12. The method of claim 1, wherein the zeolite is zeolite Naβ.

13. The method of claim 12, wherein the size of the zeolite Naβ nanocrystals are between about 15 to about 40 nm.

14. The method of claim 12, wherein the diameter of the zeolite Naβ mesopores are between about 10 to about 15 nm.

15. The method of claim 12, wherein the total surface area ($S_{tot}$) of the zeolite Naβ is from about 638 to about 664 $m^2/g$.

16. The method of claim 12, wherein the external surface area ($S_{ext}$) of the zeolite Naβ is from about 20 to about 200 $m^2/g$.

17. The method of claim 12, wherein the zeolite Naβ is present as aggregates of from about 120 to about 140 nm.

18. The method of claim 12, wherein the micropore volume ($V_{micro}$) of the zeolite Naβ is from about 0.144 to about 0.233 cc/g.

19. The method of claim 12, wherein the mesopore volume ($V_{meso}$) of the Naβ is from about 0.400 cc/g to about 0.838 cc/g.

20. The method of claim 12, wherein the heating is carried out at a temperature of from about 120 to about 130° C. for about 30 to about 34 hours.

21. The method of claim 12, wherein the Naβ zeolites are formed at a pH of from about 12.03 to about 12.19.

22. The method of claim 1, wherein the solvent comprises water.

23. The method of claim 1, wherein the silicon source comprises tetraethylorthosilane (TEOS) ($C_8H_{20}O_4Si$).

24. The method of claim 1, wherein the mono-ammonium organic template comprises a tetraalkylammonium cation.

25. The method of claim 24, wherein the tetraalkylammonium cation comprises tetraethyl ammonium cation or tetrapropyl ammonium cation.

26. The method of claim 1, wherein the aluminum source comprises sodium aluminate ($NaAlO_2$).

\* \* \* \* \*

UNITED STATES PATENT AND TRADEMARK OFFICE
CERTIFICATE OF CORRECTION

PATENT NO.        : 8,951,498 B2                                               Page 1 of 1
APPLICATION NO.   : 13/193180
DATED             : February 10, 2015
INVENTOR(S)       : Larsen et al.

It is certified that error appears in the above-identified patent and that said Letters Patent is hereby corrected as shown below:

In the Specification

In column 5, line 31, delete "clacined" and insert --calcined--, therefor.

In column 8, line 67, delete "L530)," and insert --LS30),--, therefor.

In column 23, line 20, after "Langmuir", insert --20--.

Signed and Sealed this
Twenty-fifth Day of August, 2015

Michelle K. Lee
*Director of the United States Patent and Trademark Office*